United States Patent
Sung

(10) Patent No.: US 9,973,257 B1
(45) Date of Patent: May 15, 2018

(54) RF SLAVE REPEATER MANAGEMENT

(71) Applicant: Sprint Spectrum LP, Overland Park, KS (US)

(72) Inventor: Sanghoon Sung, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 202 days.

(21) Appl. No.: 14/829,663

(22) Filed: Aug. 19, 2015

(51) Int. Cl.
   *H04B 7/155* (2006.01)

(52) U.S. Cl.
   CPC ............... *H04B 7/15528* (2013.01)

(58) Field of Classification Search
   CPC ............... H04B 7/15528; H04B 7/15557
   See application file for complete search history.

(56) References Cited

U.S. PATENT DOCUMENTS

| | | | | |
|---|---|---|---|---|
| 6,052,557 A * | 4/2000 | Kinnunen | ............ | H04W 84/08 370/337 |
| 6,404,775 B1 * | 6/2002 | Leslie | ............ | H04B 7/15528 370/315 |
| 6,859,445 B1 * | 2/2005 | Moon | ............ | H04J 13/0044 370/335 |
| 7,054,593 B2 * | 5/2006 | de La Chapelle | . | H04B 7/18506 455/12.1 |
| 7,366,463 B1 * | 4/2008 | Archer | ............ | H04B 7/18563 342/352 |
| 8,031,605 B2 * | 10/2011 | Oyman | ............ | H04B 7/2606 370/235 |
| 8,089,913 B2 * | 1/2012 | Proctor, Jr. | ........ | H04B 7/15521 370/315 |
| 8,175,004 B2 * | 5/2012 | Chang | ............ | H04W 72/0406 370/254 |
| 8,345,578 B2 * | 1/2013 | Thoumy | ............ | H04B 7/0617 370/254 |
| 8,355,668 B2 * | 1/2013 | Kawasaki | ......... | H04B 7/15528 370/328 |
| 8,594,109 B2 * | 11/2013 | Duo | ............ | H04W 48/16 370/338 |
| 8,634,334 B2 * | 1/2014 | Ahmadi | ............ | H04L 5/0007 370/295 |
| 8,660,042 B2 * | 2/2014 | Goldhamer | ............ | H04B 3/32 370/201 |
| 8,731,123 B2 * | 5/2014 | Fujimura | ........... | H03H 17/0266 342/111 |

(Continued)

FOREIGN PATENT DOCUMENTS

WO    2014182209 A1    11/2014

*Primary Examiner* — Gregory B Sefcheck

(57) ABSTRACT

A communication system where wireless devices communicating with an access node may be communicating either directly with the access node, or via a heterodyne repeater. A heterodyne repeater relays communications transparently such that operation of the access node may not provide the ability to distinguish which wireless devices are communicating directly from those that are communicating via the heterodyne repeater. The system determines whether the wireless device is communicating either directly with the access node, or via a heterodyne repeater. When a wireless device is communicating via a heterodyne repeater, the access node selects a radio resource control configuration adapted for communication via a heterodyne repeater to be used with that wireless device.

20 Claims, 15 Drawing Sheets

(56) References Cited

U.S. PATENT DOCUMENTS

| | | | | |
|---|---|---|---|---|
| 8,804,597 B2* | 8/2014 | Won | ............ | H04B 7/15557 |
| | | | | 370/315 |
| 8,805,386 B2* | 8/2014 | Cho | ............ | H04W 92/02 |
| | | | | 370/329 |
| 8,913,555 B2* | 12/2014 | Higuchi | ............ | H04B 7/15535 |
| | | | | 370/328 |
| 8,995,371 B2* | 3/2015 | Kato | ............ | H04L 5/0007 |
| | | | | 370/329 |
| 9,100,176 B2* | 8/2015 | Kanellakopoulos | ..... | H04B 3/36 |
| 9,166,842 B2* | 10/2015 | Darthenay | ............ | H04B 7/155 |
| 9,276,661 B2* | 3/2016 | Sfar | ............ | H04B 7/15592 |
| 9,468,022 B2* | 10/2016 | Li | ............ | H04W 74/0833 |
| 9,485,720 B2* | 11/2016 | Lee | ............ | H04W 8/26 |
| 9,503,909 B2* | 11/2016 | Oh | ............ | H04B 7/155 |
| 9,549,418 B2* | 1/2017 | Kato | ............ | H04L 5/0007 |
| 9,584,212 B2* | 2/2017 | Kwon | ............ | H04B 7/15557 |
| 9,591,630 B2* | 3/2017 | Kato | ............ | H04W 52/0206 |
| 9,622,219 B2* | 4/2017 | Takano | ............ | H04W 72/04 |
| 2007/0153758 A1* | 7/2007 | Kang | ............ | H04B 7/2606 |
| | | | | 370/338 |
| 2009/0227201 A1* | 9/2009 | Imai | ............ | H04B 7/15557 |
| | | | | 455/7 |
| 2013/0215820 A1* | 8/2013 | Redana | ............ | H04W 16/26 |
| | | | | 370/315 |
| 2016/0212682 A1* | 7/2016 | Chung | ............ | H04W 36/30 |

* cited by examiner

RF SLAVE REPEATER MANAGEMENT

TECHNICAL BACKGROUND

Wireless communication networks are widely deployed to provide communication services to both fixed and mobile devices. These services can include voice, data, video, messaging, web browsing, etc. Wireless communication has certain advantages, such as mobility, over wired communications for accessing a network. Various wireless standards have been adopted or proposed for wireless networks. These standards include 802.11 (WiFi), 802.16 (WiMAX), TIA-856 (which is also known as Evolution-Data Optimized—EV-DO), and long term evolution (LTE). Additional standards such as the fourth generation communication system (4G) are also being pursued.

Because of transmit power regulations, interference, and/or radio wave propagation characteristics, a base station may be unable to provide some wireless devices (a.k.a., user equipment—UE) with coverage and/or a desired level of service (e.g., throughput, packet loss, etc.). One approach to improving coverage and/or service, particularly to user equipment near the edge of, or outside of, a base station's direct coverage area is to relay communication between the base station and a wireless device via a repeater.

One type of repeater (a.k.a. relay node) receives signals on an initial frequency band or carrier. These signals are amplified and then retransmitted on another frequency band or carrier without demodulating, decoding, or otherwise digitally processing the underlying transmitted data. These repeaters may be referred to as heterodyne repeaters since the frequency conversion of the received signal may be translated to the other frequency band using heterodyning. Heterodyning is a technique in which signals are shifted to a new frequency by combining or mixing the input signals with a sine wave of another frequency. Thus, heterodyning is useful for shifting signals into a new frequency range with simple hardware, very little delay, and without complex baseband signal processing. For long term evolution (LTE) specified communication systems, a heterodyne repeater can translate signals on a frequency band associated with a first E-UTRA Absolute radio-frequency channel number (EARFCN) to a second EARFCN (and vice versa).

When used to relay signals between a wireless device and an access node, however, the access node may be unaware that a particular wireless device is communicating via a heterodyne (or frequency shifting) repeater. Thus, the access node may not adequately service the wireless device being relayed.

Overview

In an embodiment, a method of operating a communication system, includes determining that a first wireless device is communicating directly with an access node. In response to determining that the first wireless device is communicating directly with the access node, a first radio resource control configuration is selected to be used to communicate with the first wireless device. The method further includes determining that a second wireless device is communicating with the access node via a heterodyne repeater. In response to determining that the second wireless device is communicating with the access node via the heterodyne repeater, a second radio resource control configuration is selected to be used to communicate with the second wireless device.

In an embodiment, a communication system includes an access node, a heterodyne repeater, and a processor. The access node communicates directly with a first wireless device that is using a first carrier frequency. The heterodyne repeater relays communication between the access node and a second wireless device. The second wireless device communicates with the access node via the heterodyne repeater using a second carrier frequency. The heterodyne repeater translates communication from the access node from the first carrier frequency to the second carrier frequency. The heterodyne repeater also translates communication from the second wireless device from the second carrier frequency to the first carrier frequency. The processor detects that the first wireless device is communicating directly with the access node. In response to detecting that the first wireless device is communicating directly with the access node, the processor selects a first radio resource control configuration to be used by the access node to communicate with the first wireless device. The processor also detects that the second wireless device is communicating with the access node via the heterodyne repeater. In response to determining that the second wireless device is communicating with the access node via the heterodyne repeater, the processor selects a second radio resource control configuration to be used by the access node to communicate with the second wireless device.

In an embodiment, a method of operating a communication system includes determining whether a wireless device is communicating with an access node via a frequency converting repeater. The frequency converting repeater retransmitting air-interface signals received from the access node and the wireless device using air-interface frequencies that are different from the frequencies the access node and the wireless device use to transmit signals. The frequency converting repeater retransmits the signals without demodulating and decoding the signals. Based on a determination that the wireless device is communicating with the access node via the frequency converting repeater, a radio resource control configuration adapted for communication via the frequency converting repeater is applied to communication with the wireless device.

DETAILED DESCRIPTION

In an embodiment, wireless devices communicating with an access node may be communicating either directly with the access node, or via a heterodyne repeater. Because a heterodyne repeater relays communications transparently, conventional operation of the access node does not provide the ability to distinguish which wireless devices are communicating directly from those that are communicating via the heterodyne repeater. This can cause a degradation in the service provided by the access node.

In an embodiment, the frequency of operation of a wireless device is determined by the access node. This is used to determine whether the wireless device is communicating either directly with the access node, or via a heterodyne repeater. In other words, when the frequency band being used by the wireless device is the same as the frequency band being used by the access node, the wireless device is communicating directly with the access node. When the frequency band being used by the wireless device does not match the frequency band being used by the access node, the wireless device is communicating via a frequency converting (i.e., heterodyne) repeater.

In an embodiment, when a wireless device is communicating via a heterodyne repeater, the access node selects a radio resource control configuration to be used with that wireless device. The radio resource control configuration that is used with repeater connected devices is different than the radio resource control configuration used with devices that are communicating directly with the access node.

For example, air-interface resource scheduling (e.g., physical resource block allocations and/or time slot allocations) may be changed depending on whether a device is communicating directly or via a repeater. In another example, the transmit power used to communicate with repeater connected devices may be changed depending on whether a device is communicating directly or via a repeater. In another example, the access node may use carrier aggregation with directly connected devices, but not with repeater connected devices. In another example, handover procedures may be altered to accommodate devices moving from repeater coverage to direct access node coverage (and vice versa.) In a final example, repeater connected devices may be configured with different cell reselection priorities than directly connected devices.

Figure 1:
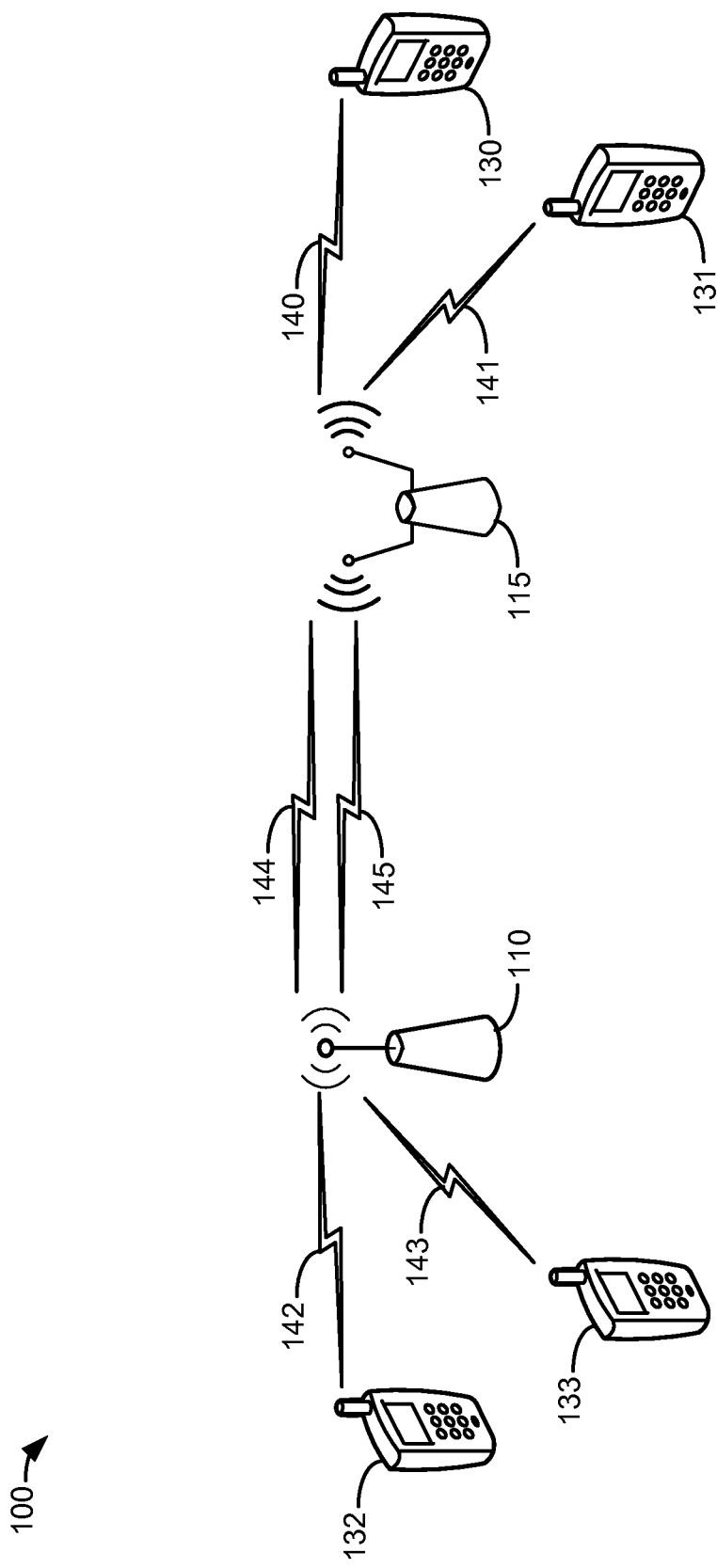
FIG. 1 is a block diagram illustrating a communication system.

FIG. 1 is a block diagram illustrating a communication system. In FIG. 1, communication system 100 comprises access node 110, heterodyne repeater 115, wireless device 130, wireless device 131, wireless device 132, and wireless device 133. A wireless device 130-133 each may also be referred to as user equipment, or UE. Access node 110 is illustrated as being operatively coupled to wireless device 133 via wireless link 143. Access node 110 is illustrated as being operatively coupled to wireless device 133 via wireless link 144. Thus, wireless device 132 and wireless device 133 are directly connected to access node 110.

Wireless device 130 is illustrated as being operatively coupled to heterodyne repeater 115 by wireless link 140. Wireless device 131 is illustrated as being operatively coupled to heterodyne repeater 115 by wireless link 141. Access node 110 is operatively coupled to heterodyne repeater 115 by wireless link 144 and wireless link 145. In an embodiment, wireless link 144 and wireless link 145 operate using a first frequency band. Wireless link 142 and wireless link 143 also use this first frequency band. Wireless link 140 and wireless link 141 operate using a second frequency band.

Heterodyne repeater 115 receives communications destined for wireless device 130 from access node 110 via wireless link 144 on the first frequency band. Likewise, heterodyne repeater 115 receives communications destined for wireless device 131 from access node 110 via wireless link 145 on the first frequency band. Heterodyne repeater 115 transparently translates the communications destined for wireless device 130 from the first frequency band to the second frequency band and sends those communications to wireless device 130 via wireless link 140 (i.e., using the second frequency band.) Likewise, heterodyne repeater 115 transparently translates communications destined for wireless device 131 from the first frequency band to the second frequency band, and retransmits those communications to wireless device 131 via wireless link 141 (i.e., using the second frequency band.)

Heterodyne repeater 115 also receives communications destined for access node 110 from wireless device 130 via wireless link 140 on the second frequency band. Heterodyne repeater 115 transparently translates the communications destined for access node 110 from the second frequency band to the first frequency band, and sends those communications to access node 110 via wireless link 144 (i.e., using the first frequency band.) Likewise, heterodyne repeater 115 receives communications destined for access node 110 from wireless device 131 via wireless link 141 on the second frequency band. Heterodyne repeater 115 transparently translates communications destined for access node 110 from the second frequency band to the first frequency band and retransmits those communications to access node 110 via wireless link 145 (i.e., using the first frequency band.)

Thus, it should be understood that access node 110 is communicating with wireless device 130 and wireless device 131 indirectly via heterodyne repeater 110. Access node 110 communicates indirectly with wireless device 130 via wireless link 144, heterodyne repeater 115, and wireless link 140. Access node 110 communicates indirectly with wireless device 131 via wireless link 144, heterodyne repeater 115, and wireless link 140. It should also be understood that access node 110 is communicating directly (i.e., un-repeated or un-relayed) with wireless device 132 and wireless device 133 via wireless link 142 and wireless link 143, respectively.

Access node 110 is a network node capable of providing wireless communication to wireless device 130, wireless device 131, wireless device 132, and/or wireless device 133. Access node 110 can be, for example, one or more of a base transceiver station, a radio base station, an eNodeB device, or an enhanced eNodeB device.

Communication system 100 is a communication network that can provide wireless communication to wireless device 130, wireless device 131, wireless device 132, and/or wireless device 133. Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 may comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 100, can be, for example, twisted pair cable, coaxial cable or fiber optic cable, or combinations thereof. Wireless link 140, wireless link 141, wireless link 142, wireless link 143, wireless link 144, and/or wireless link 145 can be a radio frequency, microwave, or other similar signal. Wireless link 140, wireless link 141, wireless link 142, wireless link 143, wireless link 144, and/or wireless link 145 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication to/from access node 110, wireless device 130, wireless device 131, wireless device 132, and/or wireless device 133, but are omitted for clarity, such as base stations, base station controllers, gateways, mobile switching centers, dispatch application processors, and location registers such as a home location register or visitor location register. Furthermore, other network elements may be present to facilitate communication between among elements of communication system 100 which are omitted for clarity, including additional processing nodes, routers, gateways, and physical and/or wireless data links for carrying data among the various network elements.

Wireless device 130, wireless device 131, wireless device 132, and/or wireless device 133 may be any device, system, combination of devices, or other such communication platform capable of directly communicating wirelessly with access node 110. Wireless device 130, wireless device 131, wireless device 132, and/or wireless device 133 may be any device, system, combination of devices, or other such communication platform capable of indirectly communicating wirelessly with access node 110 via heterodyne repeater 115.

Wireless device 130, wireless device 131, wireless device 132, and/or wireless device 133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Heterodyne repeater 115 may be any device or network element that provides relay communication capability using heterodyning. As discussed above, heterodyning is a technique in which signals are shifted to a new frequency by combining or mixing the input signals with a sine wave of another frequency. Thus, heterodyning is useful for shifting signals into a new frequency range with simple hardware, very little delay, and without complex baseband signal processing. Hardware used to implement a heterodyne repeater may include wireless devices, macro access nodes, small-cell access nodes and combinations of these.

In an embodiment, communication system 100 (and/or access node 110, in particular) can determine whether a particular wireless device 130-133 is communicating directly with access node 110, or is communicating indirectly with access node 110 via heterodyne repeater 115. For example, communication system 100 may assume that a particular wireless device 130-133 is communicating directly with access node 110 unless certain conditions and/or events occur. These conditions and/or events allow communication system 100 to determine that wireless devices 130-131 are communicating indirectly with access node 110. Based on the determination that wireless devices 130-131 are communicating indirectly with access node 110, access node 110 determines that the remaining wireless devices 132-133 are communicating directly with access node 110.

Based on the determination that wireless devices 130-131 are communicating with access node 110 indirectly via heterodyne repeater 115, communication system 100 selects and/or applies a radio resource control configuration that is adapted for communication via heterodyne repeater 115. Likewise, based on the determination that wireless devices 132-133 are communicating with access node 110 directly, communication system 100 selects and/or applies a radio resource control configuration that is adapted for direct communication with access node 110. In an embodiment, the radio resource control configuration used for communication with wireless devices 130-131 via heterodyne repeater 115 can be a configuration that controls the transmit power used to communicate via heterodyne repeater 115.

For example, since the frequency band used between heterodyne repeater 115 and wireless devices 130 is different from the frequency band used by access node 110, the signal-to-noise ratio of wireless link 140 between wireless device 130 and repeater 115 can be better than the signal-to-noise ratio of wireless link 144 between repeater 115 and access node 110. Without applying a transmit power control radio resource control configuration to be used for communication with wireless device 130, the difference between the signal-to-noise ratio of wireless link 140 and wireless link 144 can result in the allocation, by access node 110, of a higher modulation and coding scheme (MCS), more shared channel resources (e.g., physical resource blocks—PRBs), and/or increased time slot allocations (e.g., transmit time interval—TTI allocations). The decisions to increase the allocations to wireless device 130 may be made by a proportional-fair (PF) scheduler or a maximum C/I scheduler. This can result in an unfair allocation, or over-allocation, of air-interface resources to wireless devices 130-131 that communicate via heterodyne repeater 115.

In an embodiment, communication system 100 applies transmit power control to communication via heterodyne repeater 115 by limiting the air-interface resources scheduled for communication with indirectly connected wireless devices 130-131. For example, communication system 100 (and/or access node 110, in particular) may limit the total number of PRBs that can be allocated to indirectly connected wireless devices 130-131. In another example, communication system 100 (and/or access node 110, in particular) may limit the total number of time slots that can be allocated to indirectly connected wireless devices 130-131. In another example, communication system 100 (and/or access node 110, in particular) may limit both the total number of PRBs and the total number of time slots that can be allocated to indirectly connected wireless devices 130-131.

In an embodiment, communication system 100 applies transmit power control to communication via heterodyne repeater 115 by limiting the power spectral density of air-interface resources. For example, access node 110 may limit the power spectral density of air-interface resources used to communicate with indirectly connected wireless devices 130-131. For example, access node 110 may set the transmit power spectral density (e.g., in dBm/Hz) for PRBs that are allocable to directly connected wireless devices 132-133 to a first level, and set the transmit power spectral density for PRBs that are allocable to indirectly connected wireless devices 130-131 to a second level.

In an embodiment, the first spectral density level may be less than the second spectral density level. Since the RF quality experienced by indirectly connected wireless devices 130-131 substantially depends on the transmit power of heterodyne repeater 115 rather than the transmit power of access node 110, a better allocation of transmit signal power can be achieved by reducing the relative power of transmissions to indirectly connected wireless devices 130-131 as compared to the power of transmissions to directly connected wireless devices 132-133. In other words, as long as the signal power level being received by indirectly connected wireless devices 130-131, after amplification and retransmission by heterodyne repeater 115, is above a required minimum level (or threshold), access node 110 does not need to transmit over links 144-145 at the same level(s) access node 110 uses to transmit over links 142-143. This limiting of transmit power spectral density of PRBs allocable to repeater connected wireless devices 130-131 can reduce interference to neighboring cells (not shown in FIG. 1).

In an embodiment, a radio resource control configuration used for communication with wireless devices 130-131 via heterodyne repeater 115 can be a configuration that controls whether, or what type of, carrier aggregation is used to communicate with indirectly connected wireless devices 130-131 that communicate with access node 110 via heterodyne repeater 115. Carrier aggregation (CA, a.k.a., channel aggregation) utilizes more than one carrier to thereby increase the overall transmission bandwidth available for communication. Carrier aggregation typically includes communicating using a primary carrier and at least one secondary carrier. These channels or carriers may be in contiguous elements of the spectrum, or they may be in different bands.

The number of carrier frequencies available for aggregation via heterodyne repeater 115 may be less than the total number of carrier frequencies available to access node 110 for aggregation. For example, access node 110 may use carrier aggregation to utilize frequency bands $f_1$ and $f_2$ to improve the communication bandwidth with one or more of the wireless devices 130-133 access node 110 is serving. However, heterodyne repeater 115 may translate frequency band $f_1$ to $f_3$ (and back), but does not repeat (or does not translate) frequency band $f_2$. In an embodiment, access node 110 can restrict assignment of the primary carrier to a frequency band relayed and translated by heterodyne repeater 115 (i.e., frequency band $f_1$.)

In other words, for directly connected wireless devices 132-133, access node 110 may implement carrier aggregation using $f_1$ and $f_2$. For directly connected devices 132-133, either $f_1$ or $f_2$ may be assigned to be the primary carrier (and the other the secondary carrier.) However, based on $f_2$ not being amplified by repeater 115, access node 110 can be configured to only assign $f_1$ to be the primary carrier for communication with indirectly connected wireless devices 130-131.

In an embodiment, the radio resource control configuration used for communication with wireless devices 130-131 via heterodyne repeater 115 can be a configuration that efficiently handles handovers from communicating directly with access node 110 to communicating indirectly via heterodyne repeater 115, and vice versa. For example, when wireless device 133 that is communicating directly with access node 110 moves into a coverage area of repeater 115, communication system 100 should reconfigure wireless device 133 to communicate indirectly via repeater 115. In an embodiment, when communication system 100 (and access node 110, in particular) determine that the conditions exist to move wireless device 133 from communicating directly with access node 110 to communicating with access node 110 via heterodyne repeater 115, access node 110 can issue a frequency change command to wireless device 133. This frequency change command causes wireless device 133 to begin communicating with access node 110 via heterodyne repeater 115.

The frequency change command that causes a wireless device (e.g., wireless device 133) to begin communicating via heterodyne repeater 115 can be issued without some of the steps required for a cell-to-cell handover procedure. This frequency change command can be issued without some of the cell-to-cell handover steps because a handover is not actually taking place. The wireless device will still be served by access node 110 after the frequency change command is executed. Thus, steps such as, sending a handover request, receiving a handover request acknowledgement, sending a handover command, buffering data packets, and forwarding buffered data to the target access node, may be skipped by communication system 100 when a wireless device is moved from direct communication to indirect communication via heterodyne repeater 115. It should be understood that skipping steps typically associated with the handover procedure can improve the efficiency of communication system 100, and the utilization of resources (e.g., network bandwidth and/or PRBs), in particular.

In another example, when a wireless device 131 that is communicating indirectly with access node 110 moves from a coverage area of repeater 115 into an area better served by access node 110, communication system 100 should reconfigure wireless device 131 to communicate directly with access node 110. In an embodiment, when communication system 100 (and access node 110, in particular) determines that the conditions exist to move wireless device 131 from communicating indirectly via repeater 115 to communicating directly with access node 110, access node 110 can issue a frequency change command to wireless device 131. This frequency change command causes wireless device 131 to begin communicating directly with access node 110.

The frequency change command that causes a wireless device (e.g., wireless device 131) to begin communicating directly with access node 110 can be issued without some of the steps required for a cell-to-cell handover procedure. This frequency change command can be issued without some of the cell-to-cell handover steps because a handover is not actually taking place. The wireless device which was being served by access node 110 via repeater 115 will still be served by access node 100 after the frequency change command is executed. Thus, steps such as sending a handover request, receiving a handover request acknowledgement, sending a handover command, buffering data packets, and forwarding buffered data to the target access node, may be skipped by communication system 100 when a wireless device is moved from indirect communication to direct communication via heterodyne repeater 115. It should be understood that skipping steps typically associated with the handover procedure can improve the efficiency of communication system 100, and the utilization of resources (e.g., network bandwidth and/or PRBs), in particular.

In an embodiment, a radio resource control configuration used for communication with wireless devices 130-131 via heterodyne repeater 115 can be an idle mode cell reselection (IMCR) priority order configuration that is different from the IMCR priority order configuration used with wireless devices 132-133 that communicate directly with access node 110. For example, when a directly connected wireless device (e.g., wireless device 132) enters idle mode, access node 110 may configure the wireless device with a first IMCR priority order using a release message (e.g., an LTE RRC Release message). When an indirectly connected wireless device (e.g., wireless device 130) enters idle mode, access node 110 may configure the wireless device with a second IMCR priority order using a release message. In an embodiment, the first IMCR priority order and the second IMCR priority order are different.

For example, when directly connected wireless device 132 enters idle mode, access node 110 may send an IMCR priority order that specifies the $f_1$ band has the highest priority, the $f_2$ band the second highest priority, and the $f_3$ MHz band as the lowest priority for cell reselection. In this example, the $f_3$ band is the frequency used by heterodyne repeater 115 to communicate with indirectly connected wireless devices 130-131 over links 140-141 (which is translated back and forth to/from $f_1$ by repeater 115.) When indirectly connected wireless device 130 enters idle mode, access node 110 may send an IMCR priority order that specifies the $f_3$ band has the highest priority, the $f_1$ band the second highest priority, and the $f_2$ MHz band as the lowest priority for cell reselection. In this manner, when indirectly connected wireless device 130 exits idle mode, wireless device 130 is more likely to select the $f_3$ band and thereby remain indirectly connected to access node 110 via repeater 115.

As discussed herein, communication system 100 (and/or access node 110, in particular) can determine whether a particular wireless device 130-133 is communicating directly with access node 110, or is communicating indirectly with access node 110 via heterodyne repeater 115. In an embodiment, access node 110 broadcasts configuration information that specifies an association between sets of one or more preamble sequences and the transmit frequency band being used by a wireless device 130-133. These preamble sequences may be used, for example, by communication system 100 to allow wireless devices 130-133 to send communication (e.g., air-interface allocation requests and/or connection requests) to access node 110 using shared air-interface resources (e.g., the physical random access channel—PRACH—specified for LTE.)

For example, access node 110 may broadcast in information messages, indicators that configure wireless devices 130-133 to use a preamble sequence selected from a first set of preamble sequences when the wireless devices are using a first frequency band (e.g., channel or associated EARFCN) to communicate with access node 110. The indicators also configure wireless devices 130-133 to use a preamble sequence selected from a second set of preamble sequences when the wireless devices are using a second frequency band to communicate with access node 110. The first set of preamble sequences and the second set of preamble sequences do not overlap.

Thus, when access node 110 receives a preamble sequence from the first set of preamble sequences, access node 110 can determine that the wireless device 130-133 that sent that preamble sequence transmitted that sequence using the first frequency band. When access node 110 receives a preamble sequence from the second set of preamble sequences, access node 110 can determine that the wireless device 130-133 that sent that preamble sequence transmitted that sequence using the second frequency band.

When the first frequency band is the same frequency band that access node 110 uses with directly connected wireless devices 132-133, access node 110 knows that the wireless device 130-133 is directly connected. When the second frequency band is not the same frequency band that access node 110 uses with directly connected wireless devices 132-133 (i.e., a frequency band/channel translated by heterodyne repeater 115 for communication with indirectly connected wireless devices 130-131), access node 110 knows that the wireless device 130-133 must be indirectly connected via repeater 115. Thus, by examining which set of preamble sequences that the preamble sequence sent by a wireless device 130-133 belongs to, access node 110 can determine whether the wireless device is directly connected, or connected via heterodyne repeater 115.

In an embodiment, access node 110 may receive a connection request message that includes information about the frequency band used by the wireless device 130-133 used to transmit the connection request. The frequency band information in the connection request can be used by access node 110 to determine whether a particular wireless device 130-133 is communicating directly with access node 110, or is communicating indirectly with access node 110 via heterodyne repeater 115.

For example, as part of a process to connected to access node 110, wireless devices 130-133 send a connection request to access node 110. In an LTE specified system, this request is known as an RRC Connection Request. In an embodiment, this connection request includes information about the frequency band a respective wireless device 130-133 is using to transmit the request to access node 110. For example, in an LTE specified system, a wireless device 130-133 may send and indicator of the EARFCN the wireless device 130-133 is using in the RRC Connection Request.

Access node 110 can use the frequency band information received in the connection request to determine which of wireless devices 130-133 are communicating with access node 110 directly, and which of wireless devices 130-133 are communicating indirectly with access node 110 via heterodyne repeater 115. For example, when access node 110 maps the EARFCN received from a particular wireless device 130-133 to an EARFCN that access node 110 is using, then access node 110 can determine that the wireless device 130-133 is directly connected to access node 110. When access node 110 maps the EARFCN received from a particular wireless device 130-133 to an EARFCN that access node 110 is not using, then access node 110 can determine that the wireless device 130-133 is indirectly connected to access node 110 via heterodyne repeater 115.

In an embodiment, after a wireless device connects to access node 110, access node 110 may configure that respective wireless device 130-133 to send a message (or report) that includes information about the frequency band being used by the wireless device 130-133. The frequency band information in this message can be used by access node 110 to determine whether a particular wireless device 130-133 is communicating directly with access node 110, or is communicating indirectly with access node 110 via heterodyne repeater 115.

For example, access node 110 can configure wireless devices 130-133 to automatically send a report message when certain threshold criteria are met, or a trigger event occurs. For example, access node 110 may configure wireless devices 110-133 to send a measurement report message when a received signal power indicator falls below a certain level. This configuration may be typically done in order trigger an evaluation by access node 110 of whether conditions for handoff of a wireless device 130-133 have occurred.

In an embodiment, access node 110 can configure a wireless device 130-133 to send the report message as soon as possible. For example, access node 110 can configure a wireless device 130-133 with a report message trigger that will almost certainly (or certainly) be met by the current conditions being experienced by the wireless device 130-133. Thus, since the report message trigger is immediately satisfied, the wireless device 130-133 will send a report message with the frequency band information shortly after the wireless device 130-133 is configured with the report trigger.

For example, access node 110 can configure a wireless device 130-133 with an RF conditions trigger (e.g., SINR, or RSRP threshold) that is immediately met by the RF conditions being experienced by that particular wireless device 130-133. In other words, access node 110 can configure a wireless device 130-133 (using an RRC Connection Reconfiguration message) with a signal strength threshold for sending a measurement report (with the frequency band information) that is at a level that all of the wireless devices 130-133 (whether or not they are directly or indirectly connected) would respond by sending a measurement report. After access node 110 receives this measurement report, and determines whether a particular wireless device 130-133 is communicating directly or indirectly, access node 110 can reconfigure the wireless device with more typical triggers.

Access node 110 can use the frequency band information received in the report message to determine which of wireless devices 130-133 are communicating with access node 110 directly, and which of wireless devices 130-133 are communicating indirectly with access node 110 via heterodyne repeater 115. For example, when access node 110 maps the EARFCN received in a measurement report from a particular wireless device 130-133 to an EARFCN that access node 110 is using, then access node 110 can determine that the wireless device 130-133 is directly connected to access node 110. When access node 110 maps the EARFCN received in a measurement report from a particular wireless device 130-133 to an EARFCN that access node 110 is not using, then access node 110 can determine that the wireless device 130-133 is indirectly connected to access node 110 via heterodyne repeater 115.

Figure 2:
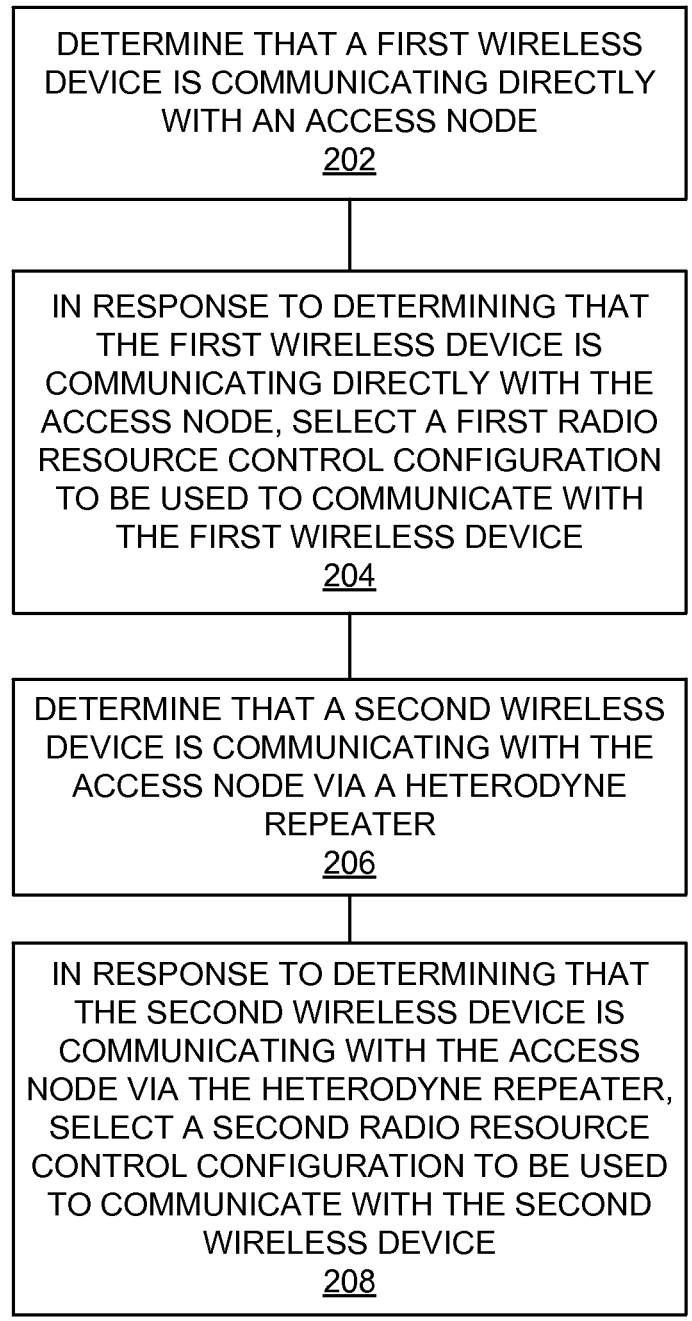
FIG. 2 is a flowchart illustrating a method of operating a communication system.

FIG. 2 is a flowchart illustrating a method of operating a communication system. The steps illustrated in FIG. 2 may be performed by one or more elements of communication system 100. It is determined that a first wireless device is communicating directly with an access node (202). For example, access node 110 may determine that wireless device 132 is communicating directly with access node 110. Access node 110 may determine that wireless device 132 is communicating directly by one or more of (as further described herein): (1) receiving a preamble sequence from wireless device 132 that is associated with a frequency band used for direct (i.e., not repeated by repeater 115) connections; (2) receiving a connection request from wireless device 132 that indicates a frequency band used for direct (i.e., not repeated by repeater 115) connections; and, (3) receiving a report message from wireless device 132 that indicates a frequency band used for direct (i.e., not repeated by repeater 115) connections.

In response to determining that the first wireless device is communicating directly with the access node, a first radio resource control configuration is selected to be used to communicate with the first wireless device (204). For example, in response to determining that wireless device 132 is communicating directly with access node 110, access node 110 may select a radio resource control configuration adapted to communicating with directly connected wireless devices (as opposed to indirectly connected devices.)

It is determined that a second wireless device is communicating with the access node via a heterodyne repeater (206). For example, access node 110 may determine that wireless device 130 is communicating indirectly with access node 110 via heterodyne repeater 115. Access node 110 may determine that wireless device 130 is communicating indirectly by one or more of (as further described herein): (1) receiving a preamble sequence from wireless device 130 that is associated with a frequency band used for indirect (i.e., repeated by repeater 115) connections; (2) receiving a connection request from wireless device 130 that indicates a frequency band used for indirect (i.e., repeated by repeater 115) connections; and, (3) receiving a report message from wireless device 130 that indicates a frequency band used for indirect (i.e., repeated by repeater 115) connections.

In response to determining that the second wireless device is communicating with the access node via the heterodyne repeater, a second radio resource control configuration is selected to be used to communicate with the second wireless device (208). For example, in response to determining that wireless device 130 is communicating indirectly with access node 110 via heterodyne repeater 115, access node 110 may select a radio resource control configuration adapted to communicating with indirectly connected wireless devices (as opposed to directly connected devices.) The radio resource control configuration that is adapted for communication with indirectly connected wireless devices may include one or more of (as further described herein): (1) air-interface resource scheduling (e.g., physical resource block allocations and/or time slot allocations) adapted for communication via repeater 115; (2) transmit power adapted for communication via repeater 115; (3) carrier aggregation adapted for communication via repeater 115; (4) handover procedures adapted to accommodate devices moving from repeater coverage to direct access node coverage (and vice versa); and, (5) using a cell reselection priority order that is adapted for communication via repeater 115.

Figure 3:
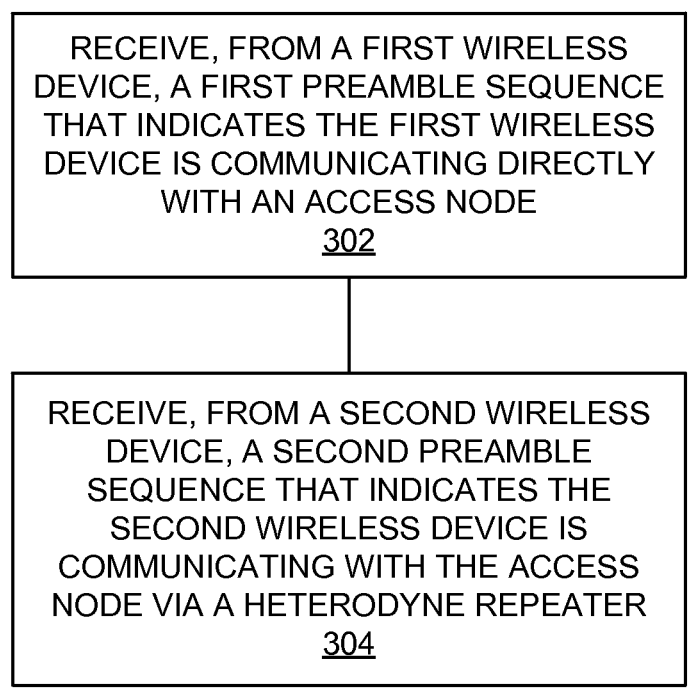
FIG. 3 is a flowchart illustrating a method that uses preamble sequences to determine whether wireless devices are communicating via a heterodyne repeater.

FIG. 3 is a flowchart illustrating a method that uses preamble sequences to determine whether wireless devices are communicating via a heterodyne repeater. The steps illustrated in FIG. 3 may be performed by one or more elements of communication system 100. From a first wireless device, a first preamble sequence that indicates the first wireless device is communicating directly with an access node is received (302). For example, access node 110 may receive, from wireless device 132, a preamble sequence that indicates wireless device 132 is directly connected to access node 110. This preamble sequence may be selected from a set of preamble sequences that are associated with a particular EARFCN (or group of EARFCNs) that are used by directly connected wireless devices 132-133. Thus, the association between directly connected wireless devices 132-133 and the particular EARFCN (or group of EARFCNs) allows access node 110 to determine that wireless device 132 is not communicating via heterodyne repeater 115.

From a second wireless device, a second preamble sequence that indicates the second wireless device is communicating with the access node via a heterodyne repeater is received (304). For example, access node 110 may receive, from wireless device 130, a preamble sequence that indicates wireless device 130 is connected to access node 110 via heterodyne repeater 115. This preamble sequence may be selected from a set of preamble sequences that are associated with a particular EARFCN (or group of EARFCNs) that are used by repeater 115 connected wireless devices 130-131. Thus, the association between repeater connected wireless devices 130-131 and the particular EARFCN (or group of EARFCNs) allows access node 110 to determine that wireless device 130 is communicating via heterodyne repeater 115.

Figure 4:
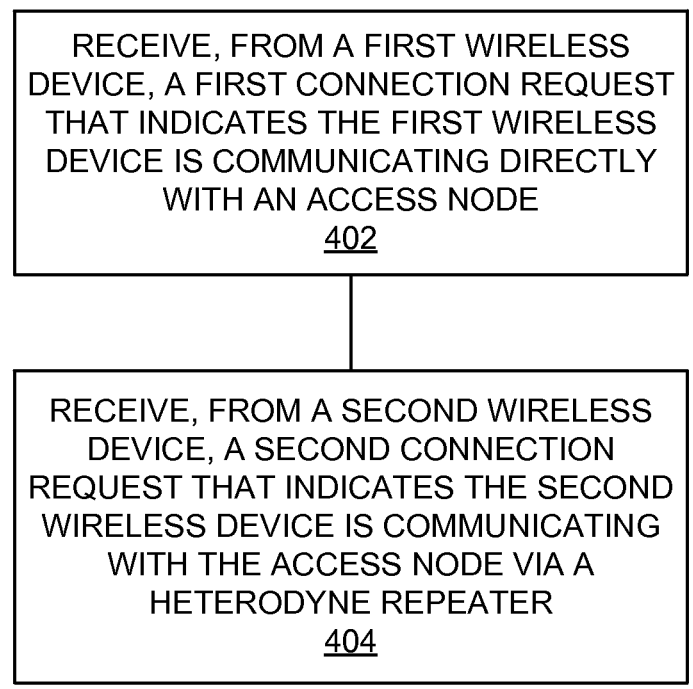
FIG. 4 is a flowchart illustrating a method that uses connection requests to determine whether wireless devices are communicating via a heterodyne repeater.

FIG. 4 is a flowchart illustrating a method that uses connection requests to determine whether wireless devices are communicating via a heterodyne repeater. The steps illustrated in FIG. 4 may be performed by one or more elements of communication system 100. From a first wireless device, a first connection request that indicates the first wireless device is communicating directly with an access node is received (402). For example, access node 110 may receive, from wireless device 132, a connection request that indicates wireless device 132 is directly connected to access node 110. This connection request may indicate that wireless device 132 is using a particular EARFCN that is used by directly connected wireless devices 132-133. Thus, the association between directly connected wireless devices 132-133 and the EARFCN allows access node 110 to determine that wireless device 132 is not communicating via heterodyne repeater 115.

From a second wireless device, a second connection request that indicates the second wireless device is communicating with the access node via a heterodyne repeater is received (404). For example, access node 110 may receive, from wireless device 130, a connection request that indicates wireless device 132 is connected to access node 110 via heterodyne repeater 115. This connection request may indicate that wireless device 130 is using a particular EARFCN that is used by repeater 115 connected wireless devices 130-131. Thus, the association between repeater connected wireless devices 130-131 and the EARFCN allows access node 110 to determine that wireless device 130 is communicating via heterodyne repeater 115.

Figure 5:
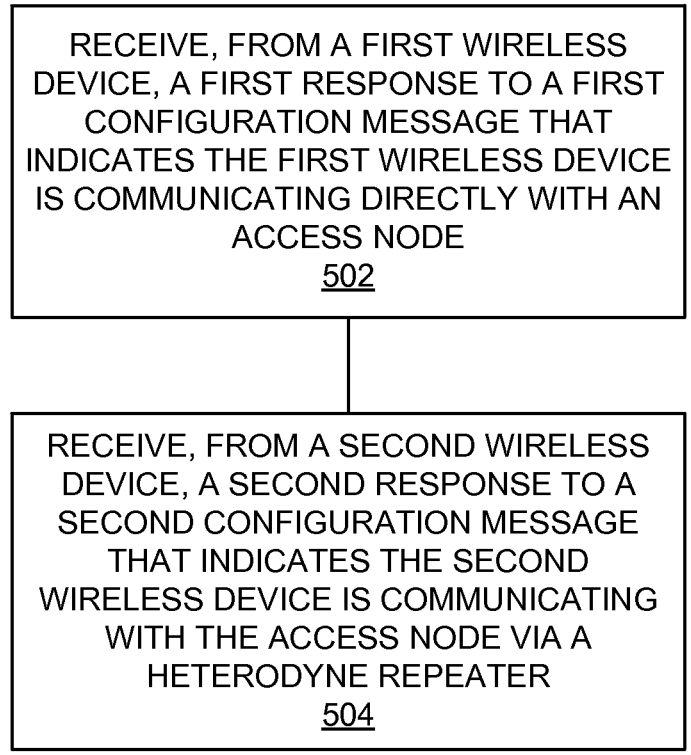
FIG. 5 is a flowchart illustrating a method that uses responses to configuration messages to determine whether wireless devices are communicating via a heterodyne repeater.

FIG. 5 is a flowchart illustrating a method that uses responses to configuration messages to determine whether wireless devices are communicating via a heterodyne repeater. The steps illustrated in FIG. 5 may be performed by one or more elements of communication system 100. From a first wireless device, a first response to a first configuration message that indicates the first wireless device is communicating directly with an access node is received (502). For example, access node 110 may configure wireless device 132 to provide a report message. Wireless device 132 may respond with a report message that includes information that allows access node 110 to determine whether wireless device 132 is communicating directly or indirectly.

For example, the configuration of wireless device 132 to provide a report message may include setting one or more criteria for sending the report message. The configuration may include setting the one or more criteria for sending a report message to values that should be immediately satisfied by the RF (or other) conditions that wireless device 132 is experiencing and/or measuring. In response to being configured with criteria values that should be quickly (if not immediately) satisfied, wireless device 132 responds by sending a report message that indicates wireless device 132 is directly connected to access node 110. This report message may indicate that wireless device 132 is using a particular EARFCN that is used by directly connected wireless devices 132-133. Thus, the association between directly connected wireless devices 132-133 and the EARFCN allows access node 110 to determine that wireless device 132 is not communicating via a heterodyne repeater 115.

From a second wireless device, a second response to a second configuration message that indicates the second wireless device is communicating with the access node via a repeater is received (504). For example, access node 110 may configure wireless device 130 to provide a report message. Wireless device 130 may then respond with a report message that includes information that allows access node 110 to determine whether wireless device 130 is communicating directly or indirectly.

For example, the configuration of wireless device 130 to provide a report message may include setting one or more criteria for sending the report message. The configuration may include setting the one or more criteria for sending a report message to values that should be immediately satisfied by the RF (or other) conditions that wireless device 130 is experiencing and/or measuring. In response to being configured with criteria values that should be quickly (if not immediately) satisfied, wireless device 130 responds by sending a report message that indicates wireless device 130 is indirectly connected to access node 110 via a repeater 115. This report message may indicate that wireless device 130 is using a particular EARFCN that is used by indirectly connected wireless devices 130-131. Thus, the association between indirectly connected wireless devices 130-131 and the EARFCN allows access node 110 to determine that wireless device 130 is communicating via a heterodyne repeater 115.

Figure 6:
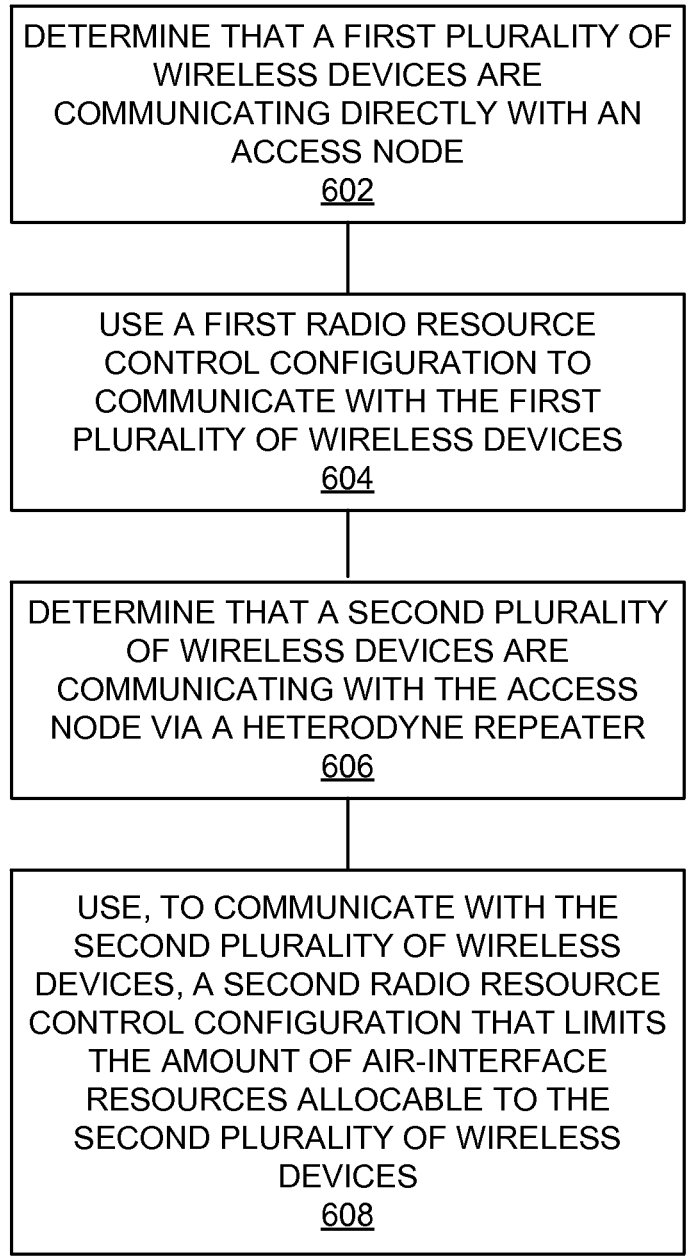
FIG. 6 is a flowchart illustrating a method of configuring a communication system.

FIG. 6 is a flowchart illustrating a method of configuring a communication system. The steps illustrated in FIG. 6 may be performed by one or more elements of communication system 100. It is determined that a first plurality of wireless devices are communicating directly with an access node (602). For example, access node 110 may determine that wireless device 132 and wireless device 133 are communicating directly (i.e., not via repeater 115) with access node 110.

A first radio resource control configuration is used to communicate with the first plurality of wireless devices (604). For example, access node 110 may, by default, use a radio resource control configuration adapted to communicating with directly connected wireless devices (as opposed to indirectly connected devices) to communicate with wireless devices 132-133.

It is determined that a second plurality of wireless devices are communicating with the access node via a heterodyne repeater (606). For example, access node 110 may determine that wireless device 130 and wireless device 131 are communicating indirectly with access node 110 via a heterodyne repeater 115.

To communicate with the second plurality of wireless devices, a second radio resource control configuration that limits the amount of air-interface resources allocable to the second plurality of wireless devices is used (608). For example, access node 110 may use a radio resource control configuration that limits the air-interface resources allocable to wireless device 130-131 (which are indirectly connected via repeater 115.) This radio resource control configuration may limit the total number of PRBs allocable to wireless device 130 and/or wireless device 131. This radio resource control configuration may limit the total number of time slots (e.g., TTIs) allocable to wireless device 130 and/or wireless device 131. This radio resource control configuration may limit both the total number of PRBs allocable to wireless device 130 and/or wireless device 131 and limit the total number of time slots allocable to wireless device 130 and/or wireless device 131.

Figure 7:
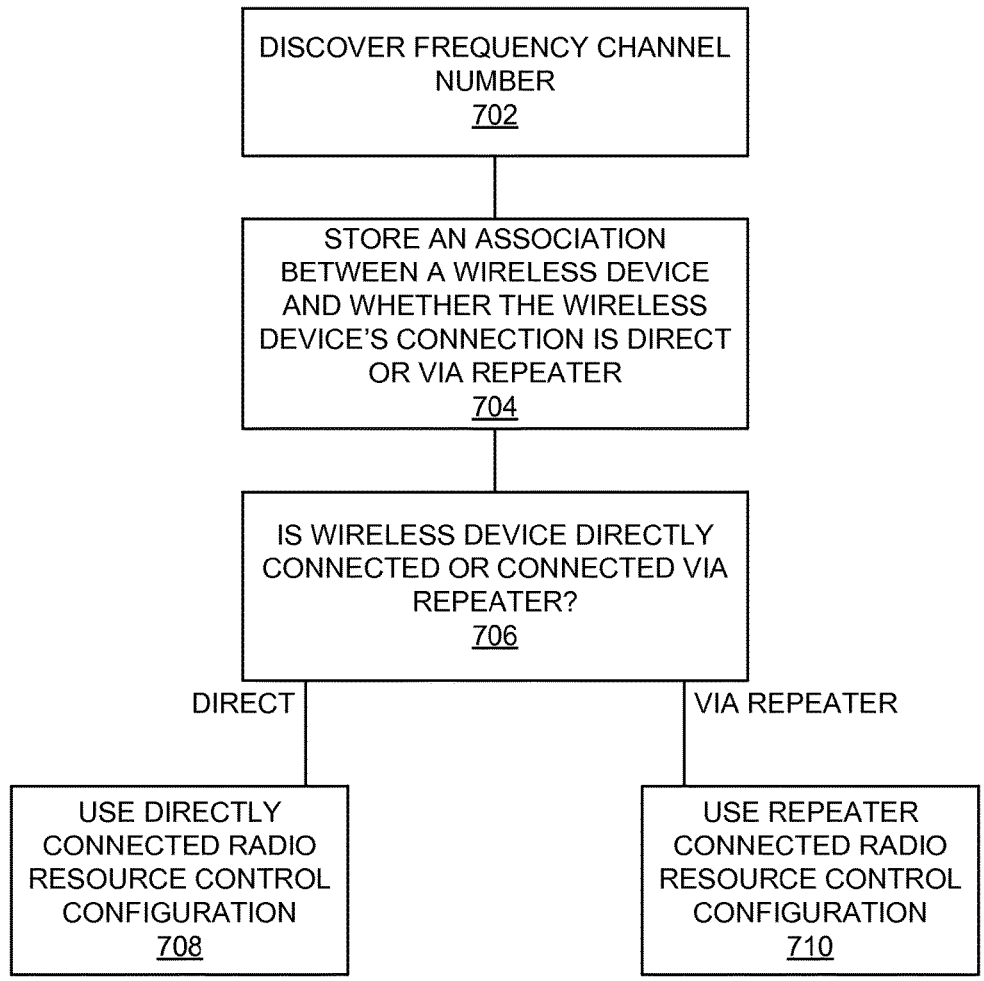
FIG. 7 is a flowchart illustrating a method of selecting radio resource control configurations.

FIG. 7 is a flowchart illustrating a method of selecting radio resource control configurations. The steps illustrated in FIG. 7 may be performed by one or more elements of communication system 100. A frequency channel number is discovered (702). For example, access node 110 may determine a frequency channel number corresponding to communication with one or more of wireless devices 130-133. Access node 110 may determine a frequency channel number corresponding to a particular wireless device 130-133 by one or more of: (1) receiving a preamble sequence from a wireless device 130-133 that is associated with a frequency channel number (or a set of frequency channel numbers); (2) receiving a connection request from wireless device 130-133 that indicates a frequency channel number; and, (3) receiving a report message from wireless device 130-133 that indicates a frequency channel number.

An association between a wireless device and whether the wireless device's connection is direct or via a repeater is stored (704). For example, access node 110 may store, based on the discovered frequency channel numbers, associations between each wireless device 130-133 and whether those frequency channel numbers indicate a respective wireless device 130-133 is connected directly or indirectly via repeater 115.

When a wireless device is directly connected, flow proceeds to box 708. When a wireless device is indirectly connected, flow proceeds to box 710 (706). A directly connected radio resource control configuration is used (708). For example, for wireless device 132-133 that is directly connected to access node 110, access node 110 may select and use a default radio resource control configuration adapted for communication with directly connected wireless devices 132-133.

A repeater connected radio resource control configuration is used (710). For example, for wireless device 130-131 that is connected to access node 110 via repeater 115, access node 110 may select and use a radio resource control configuration adapted for communication with indirectly connected wireless devices 130-131. This radio resource control configuration may include one or more of (as further described herein): (1) non-default air-interface resource scheduling (e.g., physical resource block allocations and/or time slot allocations) that is adapted for communication via repeater 115; (2) non-default transmit power limitations that are adapted for communication via repeater 115; (3) non-default carrier aggregation activation that is adapted for communication via repeater 115; (4) non-default handover procedures that are adapted to accommodate devices moving from repeater coverage to direct access node coverage (and vice versa); and, (5) using non-default cell reselection priority orders that are adapted for communication via repeater 115.

Figure 8:
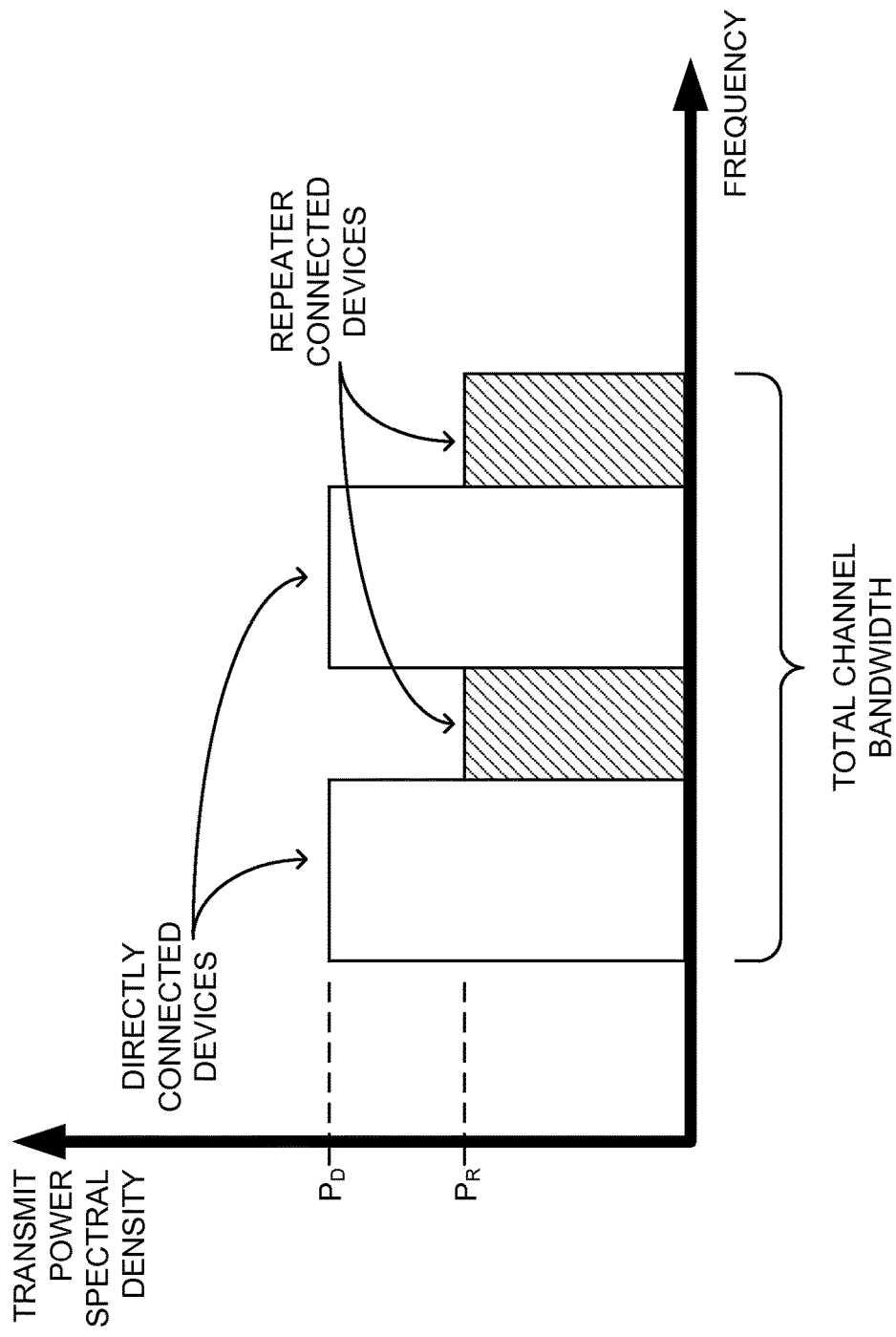
FIG. 8 is a diagram that illustrates limiting the power spectral density allocated to repeater and non-repeater connected devices.

FIG. 8 is a diagram that illustrates limiting the power spectral density allocated to repeater and non-repeater connected devices. As disclosed herein, access node 110 may limit the power spectral density of air-interface resources used to communicate with indirectly connected wireless devices 130-131. For example, access node 110 may set the transmit power spectral density (e.g., in dBm/Hz) for PRBs that are allocable to directly connected wireless devices 132-133 to a first level ($P_D$), and set the transmit power spectral density for PRBs that are allocable to indirectly connected wireless devices 130-131 to a second level ($P_R$). The PRBs allocable to repeater connected devices may also occupy different frequency portions of the total channel bandwidth. An example chart illustrating different power spectral densities and bandwidth allocations is shown in FIG. 8.

Figure 9:
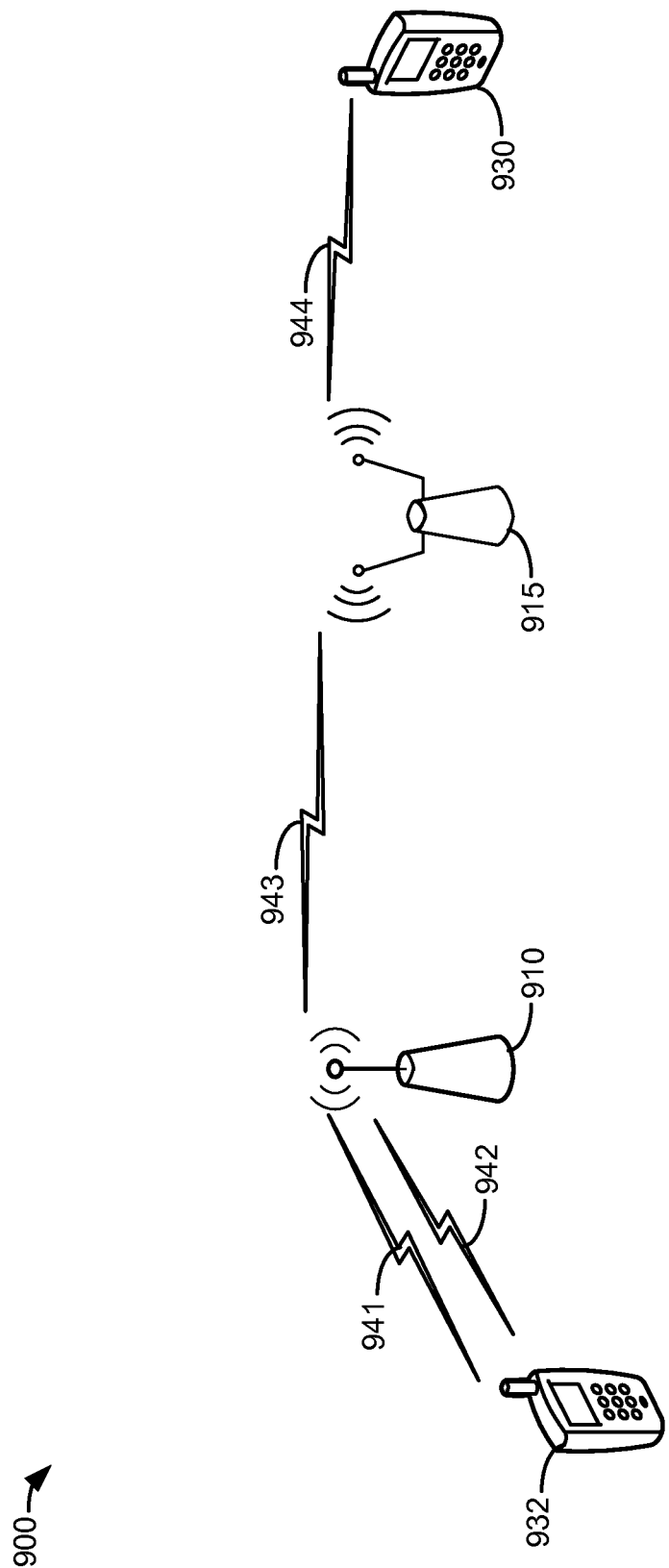
FIG. 9 is a block diagram illustrating a communication system with carrier aggregation.

FIG. 9 is a block diagram illustrating a communication system with carrier aggregation. In FIG. 9, communication system 900 comprises access node 910, heterodyne repeater 915, wireless device 930, and wireless device 932. Access node 910 is illustrated as being operatively coupled to wireless device 932 via wireless link 941 and wireless link 942. Thus, wireless device 932 is directly connected to access node 110.

Wireless device 930 is illustrated as being operatively coupled to heterodyne repeater 915 by wireless link 944. Access node 910 is operatively coupled to heterodyne repeater 915 by wireless link 943. In an embodiment, wireless link 941 and wireless link 943 operate using a first frequency band. Wireless link 942 operates using a second frequency band. Wireless link 944 operates using a third frequency band.

Heterodyne repeater 915 receives communications destined for wireless device 930 from access node 910 via wireless link 943 on the first frequency band. Heterodyne repeater 915 transparently translates the communications destined for wireless device 930 from the first frequency band to the third frequency band and sends those communications to wireless device 930 via wireless link 944 (i.e., using the third frequency band.) However, heterodyne repeater 915 does not translate communication on, or to, the second frequency band.

Thus, it should be understood that access node 910 is communicating with wireless device 930 indirectly via heterodyne repeater 910. Access node 910 communicates indirectly with wireless device 930 via wireless link 944, heterodyne repeater 915, and wireless link 943. It should also be understood that access node 910 is communicating directly (i.e., un-repeated or un-relayed) with wireless device 932 via wireless link 941 and wireless link 942 using carrier aggregation.

Access node 910 may use carrier aggregation to utilize the first frequency band (e.g., for link 941) and the second frequency band (e.g., for link 942) to improve communication bandwidth with wireless device 932. However, heterodyne repeater 915 does not repeat (or does not translate) the second frequency band. Thus, in an embodiment, access node 910 restricts assignment of the primary carrier for communication with wireless device 930 to the first frequency band. In other words, for a directly connected wireless device 932, access node 910 may implement carrier aggregation using the first frequency band (e.g., $f_1$) and/or the second frequency band (e.g., $f_2$). For a directly connected wireless device 932, either the first frequency band or the second frequency band may be assigned to be the primary carrier (and the other frequency band assigned to be the secondary carrier.) However, because the second frequency band is not translated and repeated by repeater 915, access node 910 is configured to only assign the first frequency band to be the primary carrier for communication with indirectly connected wireless device 930.

Figure 10:
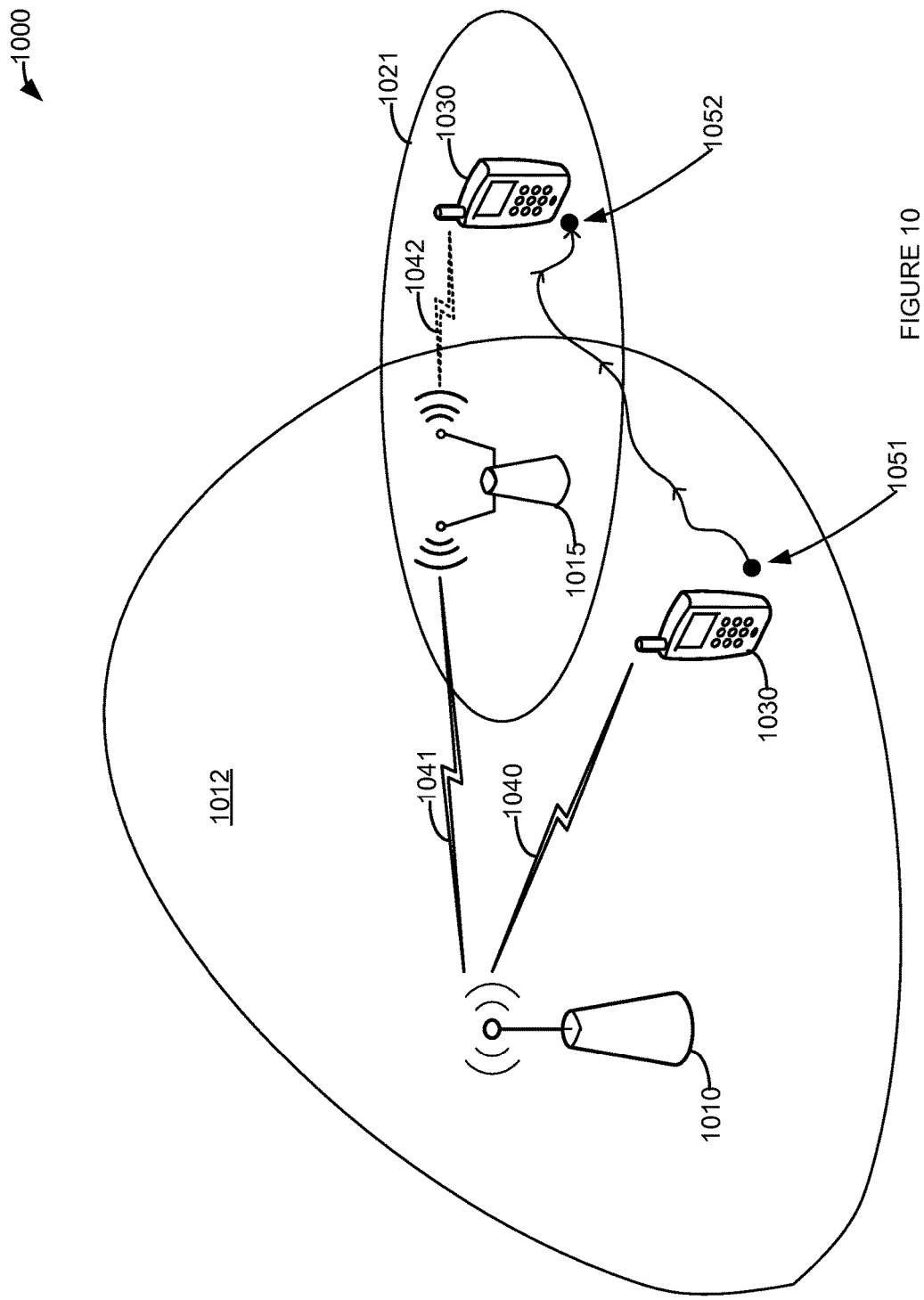
FIG. 10 is a block diagram illustrating a handover to a heterodyne repeater.

FIG. 10 is a block diagram illustrating a handover to a heterodyne repeater. In FIG. 10, communication system 1000 comprises access node 1010, heterodyne repeater 1015, and wireless device 1030. Access node 1010 is illustrated as having coverage area 1012. Heterodyne repeater 1015 is illustrated as having coverage area 1021. Wireless device 1030 is illustrated starting at a first position 1051 and traveling to a second position 1052. When at position 1051, wireless device 1030 is within access node 1010's coverage area 1012, but not within repeater coverage area 1021. When at position 1052 wireless device 1030 is within repeater 1015's coverage area 1021, but not within access node 1010's coverage area 1012.

When wireless device is at position 1051, wireless device 1030 is illustrated as directly connected to access node 1010 via wireless link 1040. After wireless device moves from position 1051 to position 1052, wireless device 1030 is indirectly connected to access node 1010 via wireless link 1041 (between access node 1010 and repeater 1015), repeater 1015, and wireless link 1042.

As wireless device 1030 leaves coverage area 1012 and moves into coverage area 1021 of repeater 1015, communication system 1000 configures wireless device 1030 to communicate indirectly with access node 1010 via repeater 1015. In an embodiment, when communication system 1000 (and access node 1010, in particular) determines that the conditions exist to move wireless device 1030 from communicating directly with access node 1010 to communicating with access node 1010 via heterodyne repeater 1015, access node 1010 issues a frequency change command to wireless device 1030. This frequency change command causes wireless device 1030 to begin communicating with access node 1010 via heterodyne repeater 1015.

The frequency change command issued by access node 1010 to wireless device 1030 causes wireless device 1030 to begin communicating via wireless link 1042 and wireless link 1041. The frequency change command can be issued without some of the steps required for a cell-to-cell handover procedure. The frequency change command can be issued without some of the cell-to-cell handover steps because a handover is not actually taking place. The wireless device 1030 will still be served by access node 1010 after the frequency change command is executed. Thus, steps such as, for example, sending a handover request, receiving a handover request acknowledgement, sending a handover command, buffering data packets, and forwarding buffered data to the target access node, may be skipped by communication system 1000 when wireless device 1030 is changed from direct communication with access node 1010 to indirect communication via heterodyne repeater 1015. It should be understood that skipping steps typically associated with a handover procedure can improve the efficiency of communication system 1000, and the utilization of resources (e.g., network bandwidth and/or PRBs), in particular.

Figure 11:
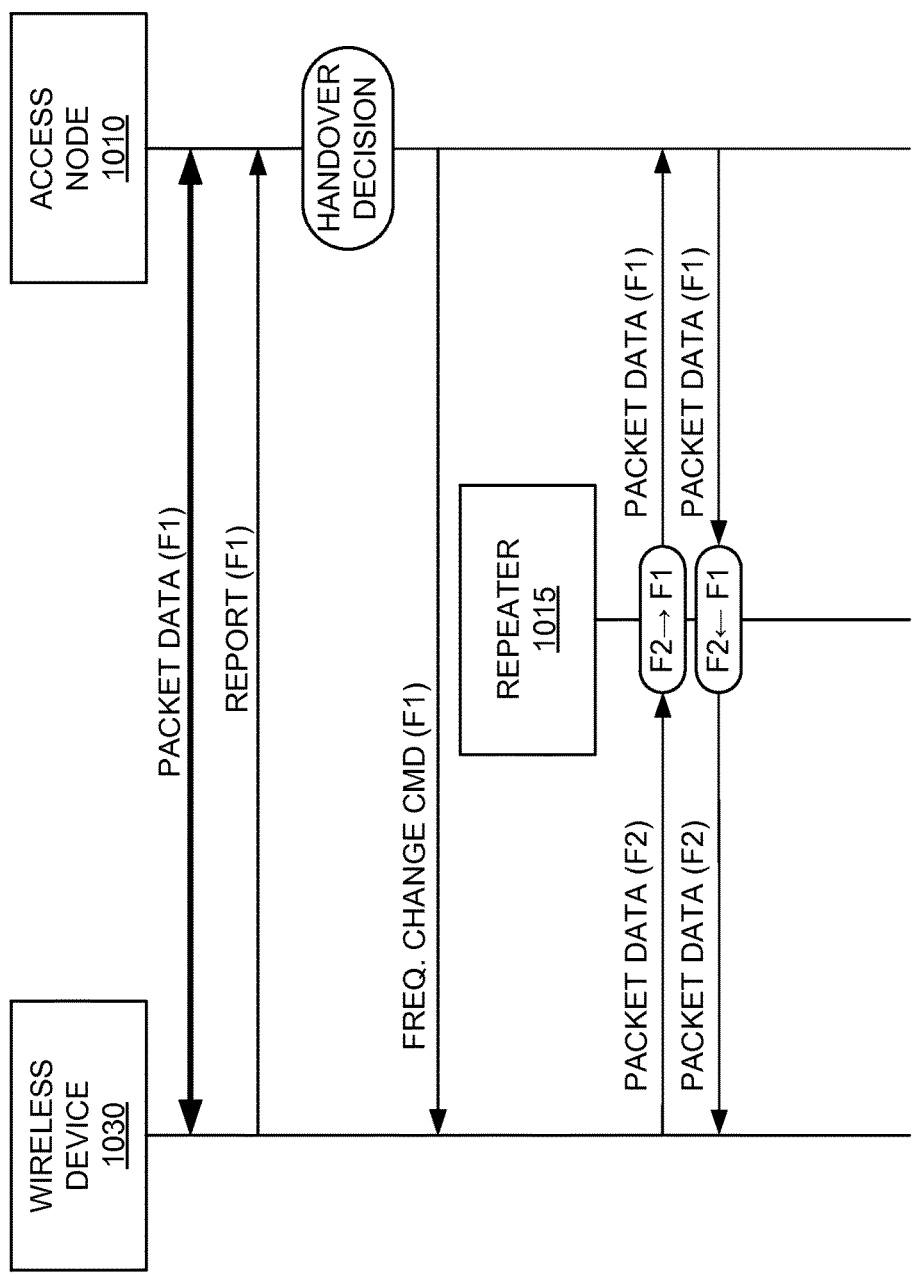
FIG. 11 is a flow diagram illustrating a process to handover a wireless device to communicating via a heterodyne repeater.

FIG. 11 is a flow diagram illustrating a process to handover a wireless device to communicating via a heterodyne repeater. The steps illustrated in FIG. 11 may be performed by one or more elements of communication system 100, communication system 900, and/or communication system 1000. The diagram in FIG. 11 begins with access node 1010 and wireless device 1030 directly exchanging packet data using a first frequency, F1. Wireless device 1030 then provides access node 1010 with a report using F1. This report can be, for example, a measurement report that includes information about the strength of a signal being provided by repeater 1015 on a second frequency, F2.

In response to the report, access node 1010 makes a handover decision that determines to handover wireless device 1030 to indirect communication via repeater 1015. As a result of determining to handover wireless device 1030 to indirect communication via repeater 1015, access node 1010 sends wireless device 1030 a frequency change command using F1.

After wireless device 1030 completes the frequency change command (and any necessary synchronization or other overhead tasks associated with a frequency change command), wireless device 1030 sends packet data using frequency F2 to repeater 1015. Repeater 1015 translates the signals receive from wireless device 1030 on frequency F2 to frequency F1 and sends these signals (i.e., packet data) to access node 1010. Likewise, after wireless device 1030 completes the frequency change command (and any necessary synchronization or other overhead tasks associated with a frequency change command), access node 1010 sends packet data using frequency F1 to repeater 1015. Repeater 1015 translates the signals receive from access node 1010 on frequency F1 to frequency F2 and sends these signals (i.e., packet data) to wireless device 1030.

Figure 12:
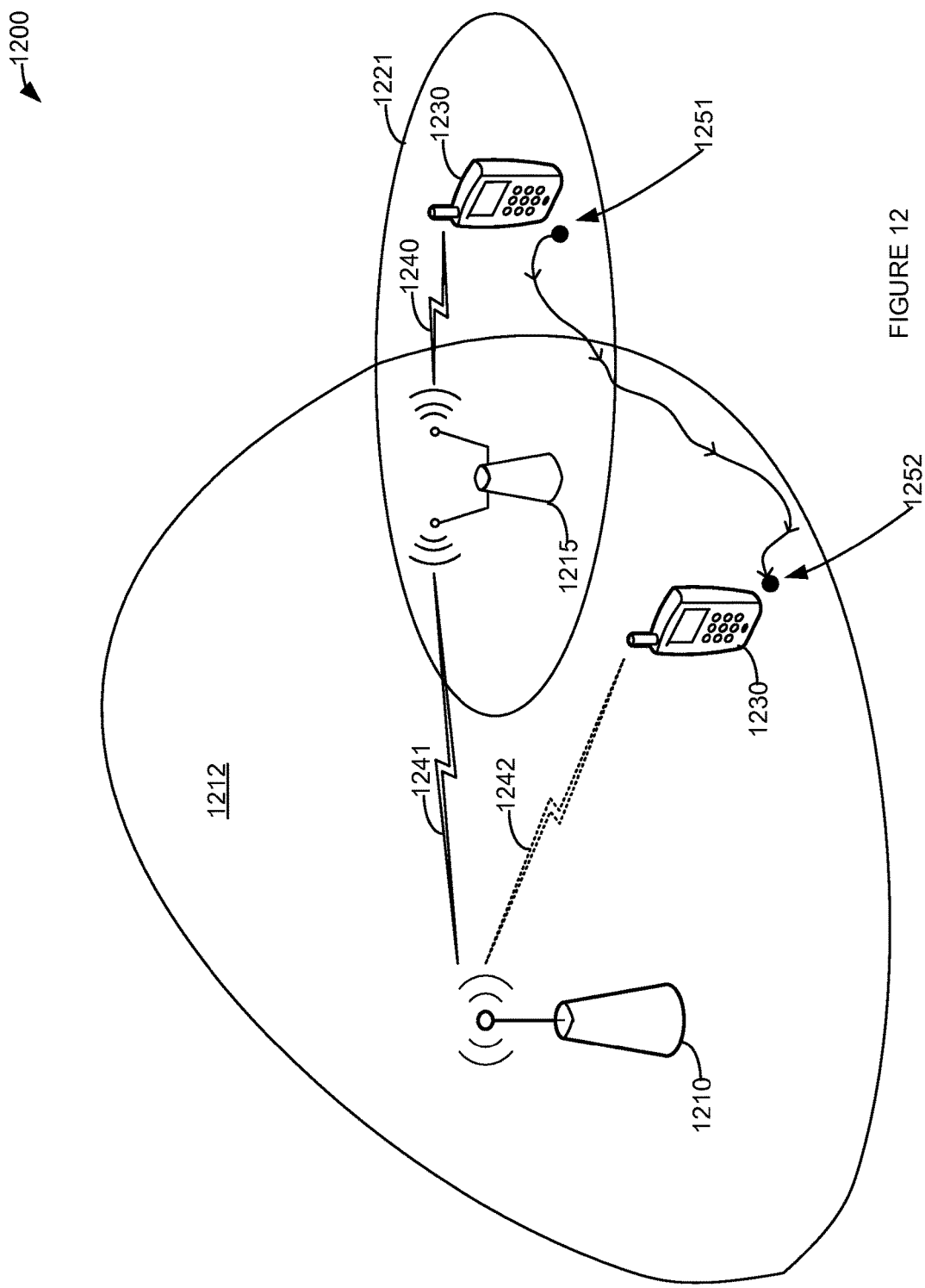
FIG. 12 is a block diagram illustrating a handover from a heterodyne repeater.

FIG. 12 is a block diagram illustrating a handover from a heterodyne repeater. In FIG. 12, communication system 1200 comprises access node 1210, heterodyne repeater 1215, and wireless device 1230. Access node 1210 is illustrated as having coverage area 1212. Heterodyne repeater 1215 is illustrated as having coverage area 1221. Wireless device 1230 is illustrated starting at a first position 1251 and traveling to a second position 1252. When at position 1251, wireless device 1230 is within repeater 1215's coverage area 1221 but not within access node 1210's coverage area 1212. When at position 1252 wireless device 1230 is within access node 1210's coverage area 1212, but not within repeater 1215's coverage area 1221.

When wireless device 1230 is at position 1251, wireless device 1230 is illustrated as indirectly connected to access node 1210 via wireless link 1240, repeater 1215, and wireless link 1241. After wireless device moves from position 1251 to position 1252, wireless device 1230 is directly connected to access node 1210 via wireless link 1242.

As wireless device 1230 leaves coverage area 1221 and moves into coverage area 1212 of access node 1210, communication system 1200 configures wireless device 1230 to communicate directly with access node 1210. In an embodiment, when communication system 1200 (and access node 1210, in particular) determines that the conditions exist to move wireless device 1230 from communicating indirectly with access node 1210 via repeater 1215 to communicating directly with access node 1210, access node 1210 issues a frequency change command to wireless device 1230. This frequency change command causes wireless device 1230 to begin directly communicating with access node 1210.

The frequency change command issued by access node 1210 to wireless device 1230 causes wireless device 1230 to begin communicating via wireless link 1242. The frequency change command can be issued without some of the steps required for a cell-to-cell handover procedure. The frequency change command can be issued without some of the cell-to-cell handover steps because a handover is not actually taking place. Wireless device 1230 will still be served by access node 1210 after the frequency change command is executed. Thus, steps such as, for example, sending a handover request, receiving a handover request acknowledgement, sending a handover command, buffering data packets, and forwarding buffered data to the target access node, may be skipped by communication system 1200 when wireless device 1230 changes from indirect communication with access node 1210 via heterodyne repeater 1215 to direct communication with access node 1210. It should be understood that by skipping steps typically associated with a handover procedure can improve the efficiency of communication system 1200, and the utilization of resources (e.g., network bandwidth and/or PRBs), in particular.

Figure 13:
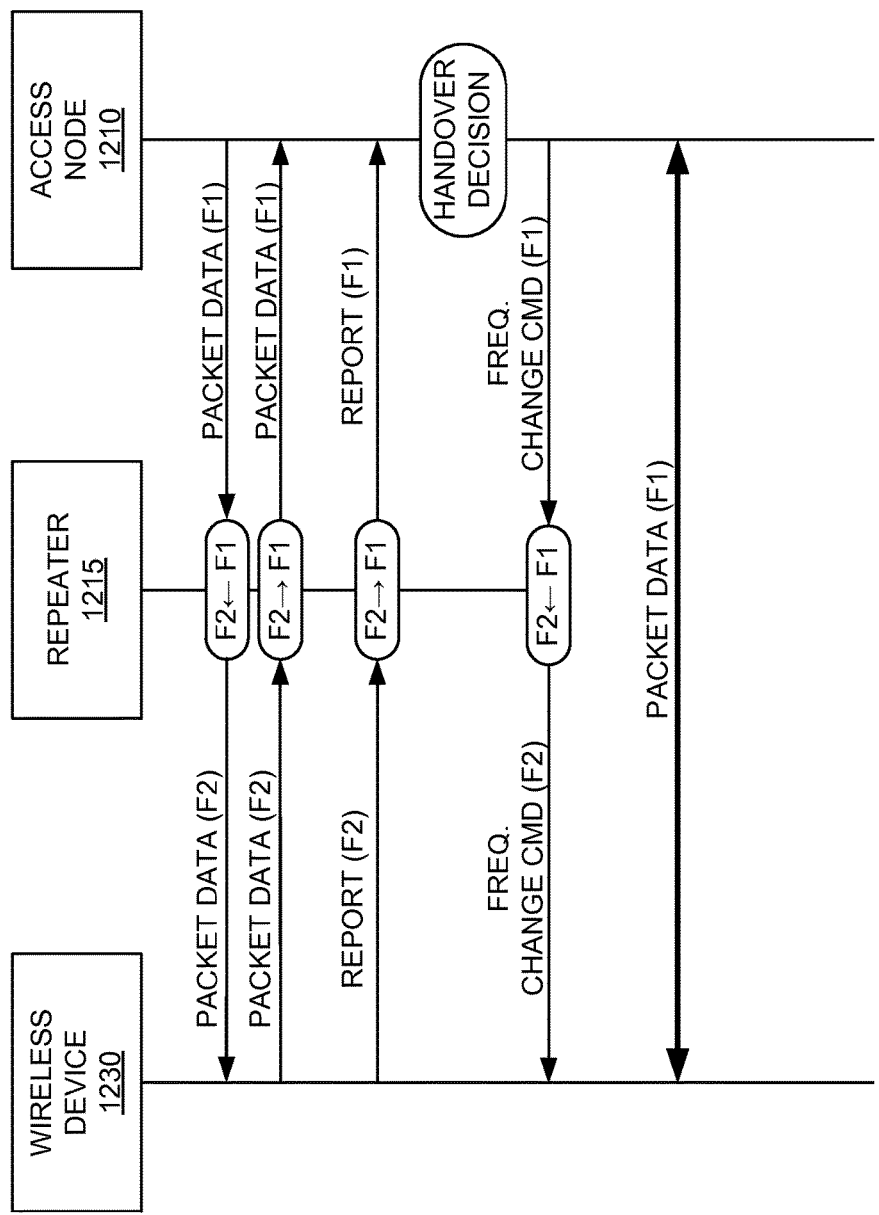
FIG. 13 is a flow diagram illustrating a process to stop communicating via a heterodyne repeater.

FIG. 13 is a flow diagram illustrating a process to stop communicating via a heterodyne repeater. The steps illustrated in FIG. 13 may be performed by one or more elements of communication system 100, communication system 900, communication system 1000, and/or communication system 1200. The diagram in FIG. 13 begins with access node 1210 and wireless device 1230 indirectly exchanging packet data using repeater 1215. Access node 1210 sends packet data using frequency F1. This packet data is received on frequency F1 by repeater 1215. Repeater 1215 translates the signals received from access node 1210 on frequency F1 and transmits them on frequency F2 to wireless device 1230. Likewise, wireless device 1230 sends packet data using frequency F2. This packet data is received on frequency F2 by repeater 1215. Repeater 1215 translates the signals received from wireless device 1230 on frequency F2 and transmits them to access node 1210 on frequency F1.

Wireless device 1230 sends access node 1210 a report using F2. This report is translated by repeater 1215 to frequency F1 and is received by access node 1210 on frequency F1. This report can be, for example, a measurement report that includes information about the strength of a signal being provided by access node 1210 on frequency F1.

In response to the report, access node 1210 makes a handover decision that determines to handover wireless device 1230 to direct communication using frequency F1. As a result of determining to handover wireless device 1230 to direct communication with access node 1210 on frequency F1, access node 1210 sends wireless device 1230 a frequency change command using F1. This frequency change command is translated by repeater 1215 to frequency F2 and is received by wireless device 1230 on frequency F2. After wireless device 1230 completes the frequency change command (and any necessary synchronization or other overhead tasks associated with a frequency change command), wireless device 1230 and access node 1210 directly exchange packet data using frequency F1.

Figure 14:
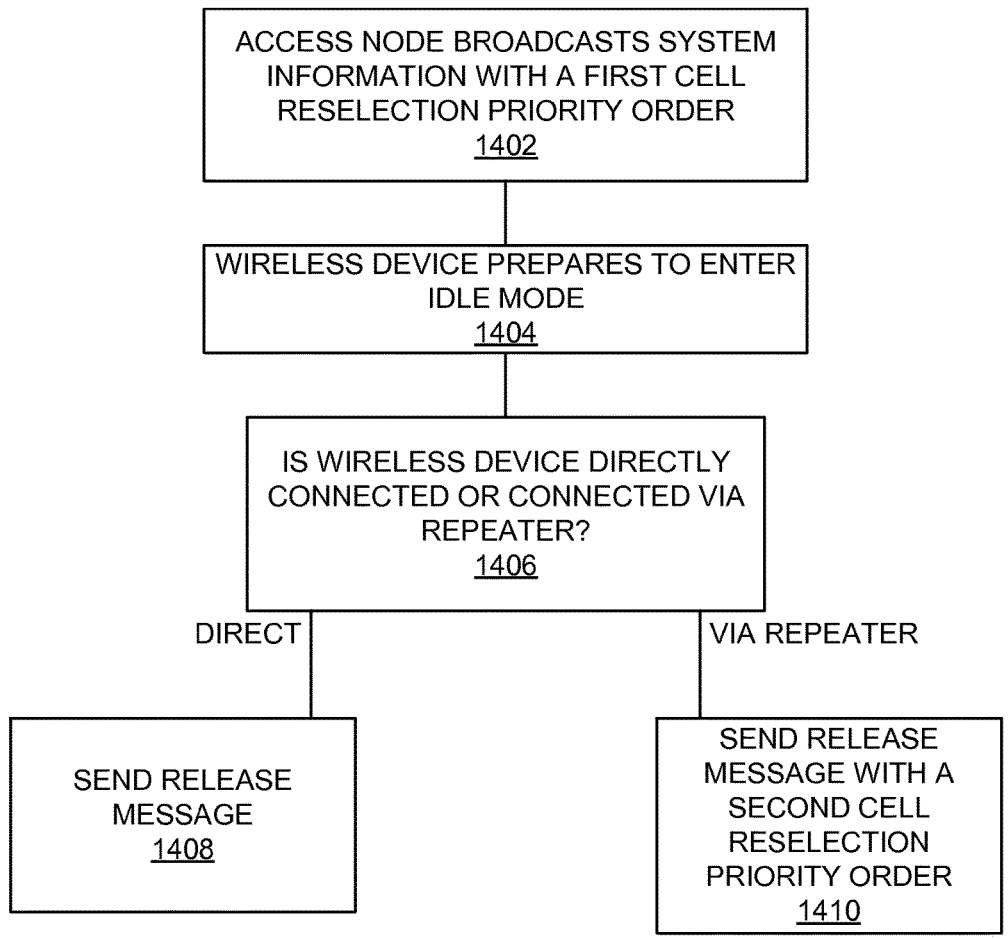
FIG. 14 is a flowchart illustrating a method of configuring cell reselection priority for communication via a heterodyne repeater.

FIG. 14 is a flowchart illustrating a method of configuring cell reselection priority for communication via a heterodyne repeater. The steps illustrated in FIG. 14 may be performed by one or more elements of communication system 100, communication system 900, communication system 1000, and/or communication system 1200. An access node broadcasts system information with a first cell reselection priority order (1402). For example, access node 110 may broadcast a cell reselection priority order to wireless devices 130-133.

A wireless device prepares to enter idle mode (1404). For example, wireless device 130 or wireless device 132 may prepare to enter an idle mode. When the wireless device preparing to enter idle mode is directly connected, flow proceeds to box 1408. When the wireless device preparing to enter idle mode is connected via a repeater, flow proceeds to box 1410.

When a wireless device preparing to enter idle mode is directly connected, a release message is sent to that wireless device (1408). This release message does not change the cell reselection priority broadcast from the first cell reselection priority order. For example, when wireless device 132 prepares to enter an idle mode, access node 110 sends a release message that does not change the cell reselection priority that wireless device 132 is configured to use.

When a wireless device preparing to enter idle mode is connected via a repeater, a release message is sent to that wireless device that has a second cell reselection priority order (1410). For example, when wireless device 130 prepares to enter an idle mode, access node 110 sends a release message that changes the cell reselection priority that wireless device 130 is configured to use. This changed cell reselection priority order may give the frequency band associated with the repeater 115 a higher priority than the frequency band associated with access node 110. In this manner, when wireless device 130 exits idle mode, it is more likely to select a configuration that will connect wireless device 130 to access node 110 via repeater 115.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100, communication system 900, communication system 1000, and/or communication system 1200 may be, comprise, or include computers systems and/or processing nodes. This includes, but is not limited to: access node 110, repeater 115, wireless devices 130-133, access node 910, repeater 915, access node 1010, repeater 1015, wireless device 1030, access node 1210, repeater 1215, and/or wireless device 1230.

Figure 15:
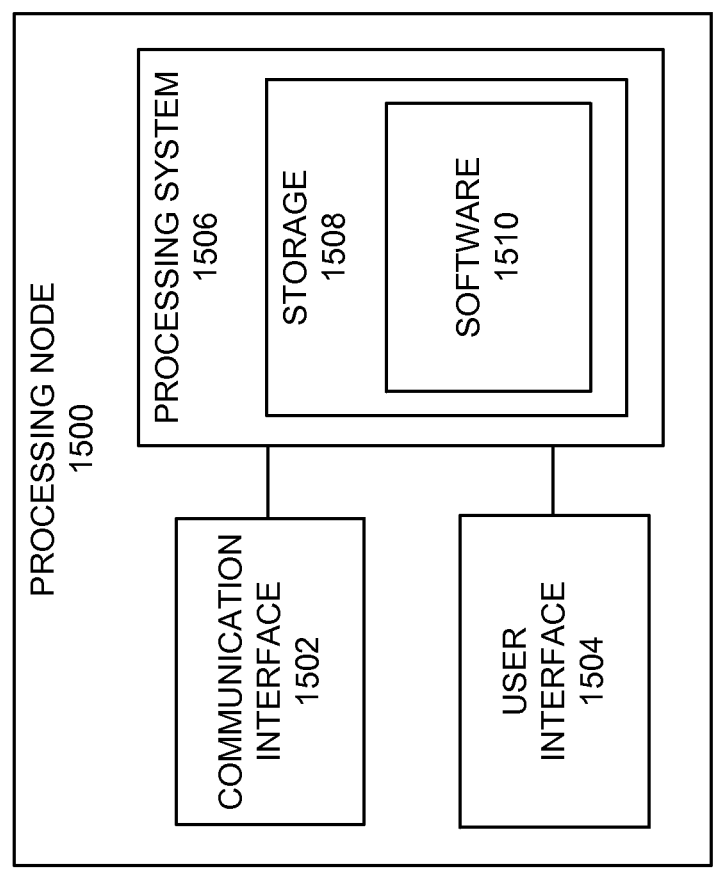
FIG. 15 illustrates a processing node.

FIG. 15 illustrates an exemplary processing node 1500 comprising communication interface 1502, user interface 1504, and processing system 1506 in communication with communication interface 1502 and user interface 1504. Processing node 1500 is capable of paging a wireless device. Processing system 1506 includes storage 1508, which can comprise a disk drive, flash drive, memory circuitry, or other memory device. Storage 1508 can store software 1510 which is used in the operation of the processing node 1500. Storage 1508 may include a disk drive, flash drive, data storage circuitry, or some other memory apparatus. Software 1510 may include computer programs, firmware, or some other form of machine-readable instructions, including an operating system, utilities, drivers, network interfaces, applications, or some other type of software. Processing system 1506 may include a microprocessor and other circuitry to retrieve and execute software 1510 from storage 1508. Processing node 1500 may further include other components such as a power management unit, a control interface unit, etc., which are omitted for clarity. Communication interface 1502 permits processing node 1500 to communicate with other network elements. User interface 1504 permits the configuration and control of the operation of processing node 1500.

An example of processing node 1500 includes access node 110. Processing node 1500 can also be an adjunct or component of a network element, such as an element of access node 110, 910, 1010, and/or 1210, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    receiving a first preamble sequence from a first wireless device, wherein the first preamble sequence is one of a first plurality of preamble sequences, each preamble sequence in the first plurality of preamble sequences being associated with a first selected channel number, the first selected channel number being utilized by the first wireless device for communicating directly with an access node;
    selecting, based on the association of the first plurality of preamble sequences with the first channel number, a first radio resource control configuration to be used to communicate with the first wireless device;
    receiving a second preamble sequence a second wireless device, wherein the second preamble sequence is one of a second plurality of preamble sequences, each preamble sequence in the second plurality of preamble sequence being associated with a second selected channel number, the second selected channel number being utilized by the second wireless device for communicating with the access node via a heterodyne repeater; and,
    selecting, based on the association of the second plurality of preamble sequences with the second selected channel number, a second radio resource control configuration to be used to communicate with the second wireless device,
    wherein the second radio resource control configuration limits an amount of air-interface resources allocable to the second wireless device, and
    wherein limiting the amount of air-interface resource allocable to the second wireless device comprises any combination of limiting a total number of physical resource blocks allocable to the second wireless device, limiting a total number of time slots allocable to the second wireless device, or limiting a transmit power spectral density of physical resource blocks allocable to the second wireless device.

2. The method of claim 1, wherein the first selected channel number comprises one of a first set of frequency channel numbers used by the first wireless device to transmit directly to the access node, and the second selected channel number comprises one of a second set of frequency channel numbers used by the second wireless device to transmit to the access node via the heterodyne repeater.

3. The method of claim 1, further comprising:
    receiving, from the first wireless device, a first connection request that indicates first wireless device is communicating directly with an access node; and,
    receiving, from the second wireless device, a second connection request that indicates second wireless device is communicating with the access node via the heterodyne repeater, the first connection request indicating the first selected channel number is being used by the first wireless device to transmit to the access node, and the second connection request indicating the second selected channel number is being used by the second wireless device to transmit to the access node.

4. The method of claim 1, further comprising:
    receiving, from the first wireless device, a first response to a first configuration message that indicates first wireless device is communicating directly with an access node; and,
    receiving, from the second wireless device, a second response to a second configuration message that indicates second wireless device is communicating with the access node via the heterodyne repeater, the first configuration message causing the first wireless device to report information that includes a first indicator of the first selected channel number that is being used by the first wireless device to receive from the access node, and the second configuration message causing the second wireless device to report information that includes a second indicator of the second selected channel number that is being used by the second wireless device to receive from the heterodyne repeater.

5. The method of claim 1, further comprising:
    determining that a first plurality of wireless devices are directly communicating with the access node;
    using the first radio resource control configuration to communicate with the first plurality of wireless devices, the first plurality of wireless devices including the first wireless device,
    determining that a second plurality of wireless devices are communicating with the access node via a heterodyne repeater; and,
    using the second radio resource control configuration to communicate with the second plurality of wireless devices, the second plurality of wireless devices including the second wireless device.

6. The method of claim 5, wherein the second radio resource control configuration limits the number of physical resource blocks allocable to the second plurality of wireless devices and limits the number of time slots allocable to the second plurality of wireless devices.

7. The method of claim 5, wherein second radio resource control configuration has a lower power spectral density for physical resource blocks allocated to the second plurality of wireless devices than the first radio resource control configuration has for physical resource blocks allocated to the first plurality of wireless devices.

8. The method of claim 5, wherein the first radio resource control configuration allows carrier aggregation for the first plurality of wireless devices using one of a first carrier and a second carrier as a primary component carrier and the second radio resource control configuration allows carrier aggregation for the second plurality of wireless devices using the first carrier as the primary component carrier.

9. A communication system, comprising:
an access node to communicate directly with a first wireless device using a first carrier frequency;
a heterodyne repeater to relay communication between the access node and a second wireless device, the second wireless device communicating with the access node via the heterodyne repeater using a second carrier frequency, the heterodyne repeater translating communication from the access node from the first carrier frequency to the second carrier frequency, the heterodyne repeater translating communication from the second wireless device from the second carrier frequency to the first carrier frequency; and,
a processor to:
receive a first preamble sequence from a first device, wherein the first preamble sequence is one of a first plurality of preamble sequences, each preamble sequence in the first plurality of preamble sequences being associated with a first selected channel number, the first selected channel number being utilized by the first wireless device for communicating directly with the access node;
select, based on the association of the first plurality of preamble sequences with the first channel number, a first radio resource control configuration to be used by the access node to communicate with the first wireless device;
receive a second preamble sequence from a second wireless device, wherein the second preamble sequence is one of a second plurality of preamble sequences, each preamble sequence in the second plurality of preamble sequences being associated with a second selected channel number, the second selected channel number being utilized by the second wireless device for communicating with the access node via the heterodyne repeater; and,
select, based on the association of the second plurality of preamble sequences with the second selected channel number, a second radio resource control configuration to be used by the access node to communicate with the second wireless device,
wherein the second radio resource control configuration limits an amount of air-interface resources allocable to the second wireless device, and
wherein limiting the amount of air-interface resource allocable to the second wireless device comprises any combination of limiting a total number of physical resource blocks allocable to the second wireless device, limiting a total number of times slots allocable to the second wireless device, or limiting a transmit power spectral density of physical resource blocks allocable to the second wireless device.

10. The communication system of claim 9, wherein:
the first selected channel number comprises one of a first set of frequency channel numbers to transmit to the access node; and,
the second selected channel number comprises one of a second set of frequency channel numbers to transmit to the access node via the heterodyne repeater.

11. The communication system of claim 9, wherein:
the access node is to receive, from the first wireless device, a first connection request that indicates first wireless device is communicating directly with an access node by indicating the first selected channel number that is being used by the first wireless device to transmit to the access node; and,
the access node is also to receive, from the second wireless device, a second connection request that indicates second wireless device is communicating with the access node via the heterodyne repeater the second connection request indicating the second selected channel number that is being used by the second wireless device to transmit to the access node via the heterodyne repeater.

12. The communication system of claim 9, wherein:
the access node is to send, to the first wireless device, a first configuration message to cause the first wireless device to report information that includes a first indicator of the first selected channel number that is being used by the first wireless device to receive from the access node;
the access node also to send, to the second wireless device, a second configuration message to cause the second wireless device to report information that includes a second indicator of the second selected channel number that is being used by the second wireless device to receive from the heterodyne repeater;
the access node to receive, from the first wireless device, a first response to the first configuration message that includes the first indicator thereby indicating to the processor that first wireless device is communicating directly with the access node; and,
the access node also to receive, from the second wireless device, a second response to the second configuration message that includes the second indicator thereby indicating to the processor that the second wireless device is communicating with the access node via the heterodyne repeater.

13. The communication system of claim 9, wherein the processor is to further:
detect that a first plurality of wireless devices are directly communicating with the access node; and,
configure the access node to use the first radio resource control configuration to communicate with the first plurality of wireless devices, the first plurality of wireless devices including the first wireless device;
detect that a second plurality of wireless devices are communicating with the access node via a heterodyne repeater;
configure the access node to use the second radio resource control configuration to communicate with the second plurality of wireless devices, the second plurality of wireless devices including the second wireless device.

14. The communication system of claim 13, wherein the second radio resource control configuration limits the number of physical resource blocks allocable to the second plurality of wireless devices and limits the number of time slots allocable to the second plurality of wireless devices.

15. The communication system of claim 13, wherein the second radio resource control configuration has a lower power spectral density for physical resource blocks allocated to the second plurality of wireless devices than the first radio resource control configuration has for physical resource blocks allocated to the first plurality of wireless devices.

16. The communication system of claim 13, wherein the first radio resource control configuration allows carrier aggregation for the first plurality of wireless devices using one of a first carrier and a second carrier as a primary component carrier and the second radio resource control configuration allows carrier aggregation for the second plurality of wireless devices using the first carrier as the primary component carrier.

17. A method of operating a communication system, comprising:
 receiving a first preamble sequence from a first wireless device, wherein the first preamble sequence is one of a first plurality of preamble sequences, each preamble sequence in the first plurality of preamble sequences being associated with a first selected channel number, the first selected channel number being utilized by the wireless device for communicating with an access node via a frequency converting repeater, the frequency converting repeater retransmitting air-interface signals received from the access node and the wireless device using air-interface frequencies that are different from the frequencies the access node and the wireless device used to transmit signals, the frequency converting repeater retransmitting the signals without demodulating and decoding the signals; and,
 applying, to communication with the wireless device based on the association of the first plurality of preamble sequences with the first channel number, a radio resource control configuration adapted for communication via the frequency converting repeater,
 wherein the radio resource control configuration limits an amount of air-interface resources allocable to the wireless device, and
 wherein limiting the amount of air-interface resource allocable to the wireless device comprises any combination of limiting a total number of physical resource blocks allocable to the wireless device, limiting a total number of time slots allocable to the wireless device, or limiting a transmit power spectral density of physical resource blocks allocable to the wireless device.

18. The method of claim 17, further comprising limiting the amount of air-interface resource allocable to one or more other repeater connected wireless devices.

19. The method of claim 17, wherein the radio resource control configuration adapted for communication via the frequency converting repeater includes a carrier aggregation control configuration that includes limiting an assignment of a primary channel for the wireless device to frequency bands relayed by the frequency converting repeater.

20. The method of claim 17, wherein the radio resource control configuration adapted for communication via the frequency converting repeater includes a handover control configuration that includes issuing a frequency change command to the wireless device based on the air-interface conditions between the frequency converting repeater and the less device.

\* \* \* \* \*